(12) United States Patent
Marinescu

(10) Patent No.: US 11,301,142 B2
(45) Date of Patent: Apr. 12, 2022

(54) NON-BLOCKING FLOW CONTROL IN MULTI-PROCESSING-ENTITY SYSTEMS

(71) Applicant: VMware, Inc., Palo Alto, CA (US)

(72) Inventor: Adrian Marinescu, Bellevue, WA (US)

(73) Assignee: VMware, Inc., Palo Alto, CA (US)

( * ) Notice: Subject to any disclaimer, the term of this patent is extended or adjusted under 35 U.S.C. 154(b) by 1269 days.

(21) Appl. No.: 15/174,376

(22) Filed: Jun. 6, 2016

(65) Prior Publication Data
US 2017/0351441 A1    Dec. 7, 2017

(51) Int. Cl.
*G06F 3/06*     (2006.01)
*G06F 9/50*     (2006.01)

(52) U.S. Cl.
CPC ............ *G06F 3/0619* (2013.01); *G06F 3/065* (2013.01); *G06F 3/067* (2013.01); *G06F 3/0631* (2013.01); *G06F 9/5027* (2013.01)

(58) Field of Classification Search
CPC ........ G06F 3/0619; G06F 3/065; G06F 3/067; G06F 3/0631; G06F 9/5027
See application file for complete search history.

(56) References Cited

U.S. PATENT DOCUMENTS

| | | | | |
|---|---|---|---|---|
| 6,542,920 B1* | 4/2003 | Belkin | ................. | G06F 9/5055 707/999.01 |
| 6,574,654 B1* | 6/2003 | Simmons | ................ | G06F 9/524 707/999.008 |
| 2007/0094669 A1* | 4/2007 | Rector | .................... | G06F 9/526 718/104 |
| 2012/0054765 A1* | 3/2012 | Lee | ........................ | G06F 9/5027 718/104 |
| 2014/0108728 A1* | 4/2014 | Nguyen | ................. | G06F 9/526 711/118 |

OTHER PUBLICATIONS

Zhou et al, Processor Pool-Based Scheduling for Large-Scale NUMA Multiprocessors, ACM 1991.*
Xu et al. Storage and retrieval of light pulses in a fast-light medium via active raman gain, Physical Review A94, 2016.*

* cited by examiner

*Primary Examiner* — Lewis A Bullock, Jr.
*Assistant Examiner* — Kevin X Lu

(57) ABSTRACT

The current document is directed to an efficient and non-blocking mechanism for flow control within a multi-processor or multi-core processor with hierarchical memory caches. Traditionally, a centralized shared-computational-resource access pool, accessed using a locking operation, is used to control access to a shared computational resource within a multi-processor system or multi-core processor. The efficient and non-blocking mechanism for flow control, to which the current document is directed, distributes local shared-computational-resource access pools to each core of a multi-core processor and/or to each processor of a multi-processor system, avoiding significant computational overheads associated with cache-controller contention-control for a traditional, centralized access pool and associated with use of locking operations for access to the access pool.

20 Claims, 48 Drawing Sheets

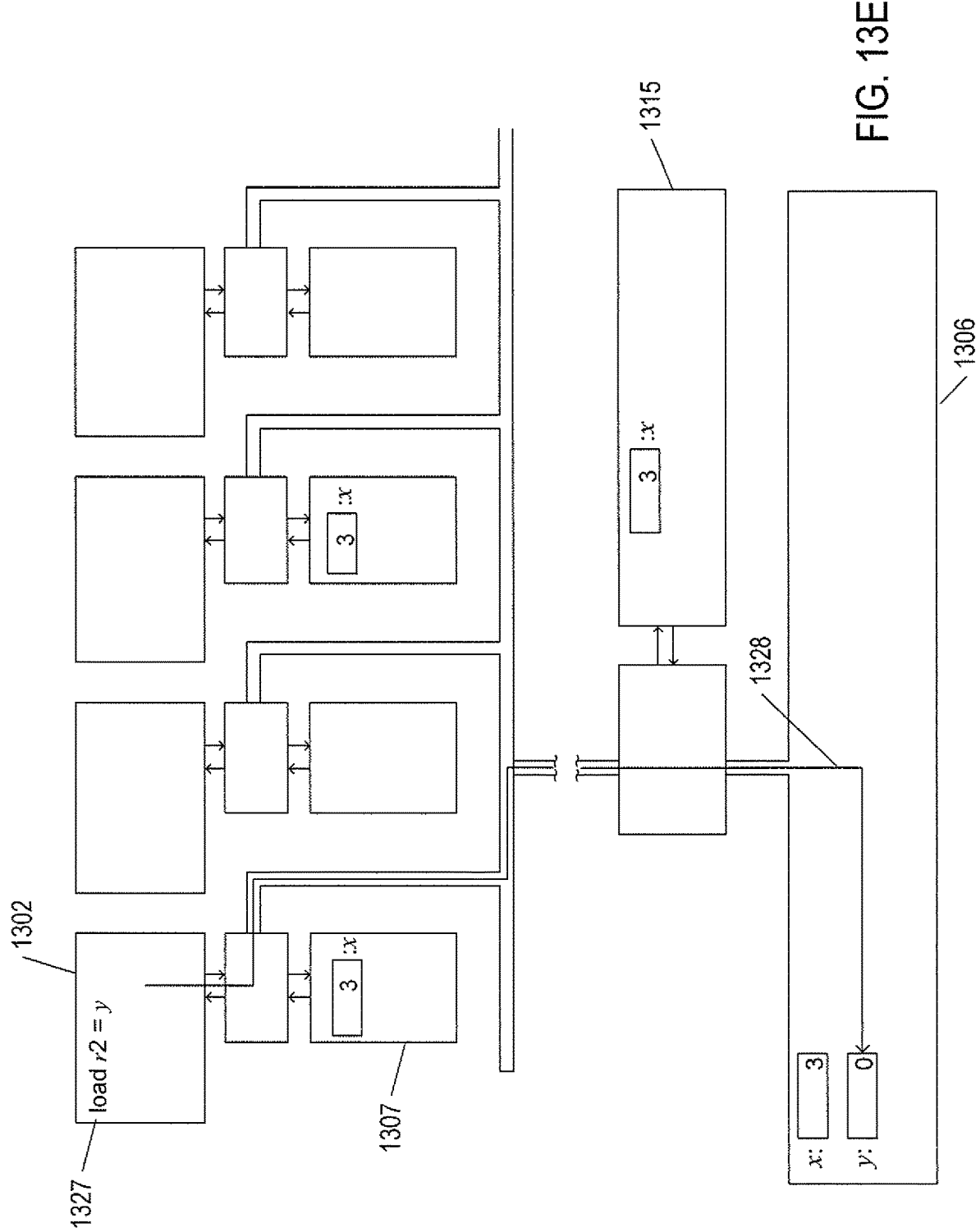

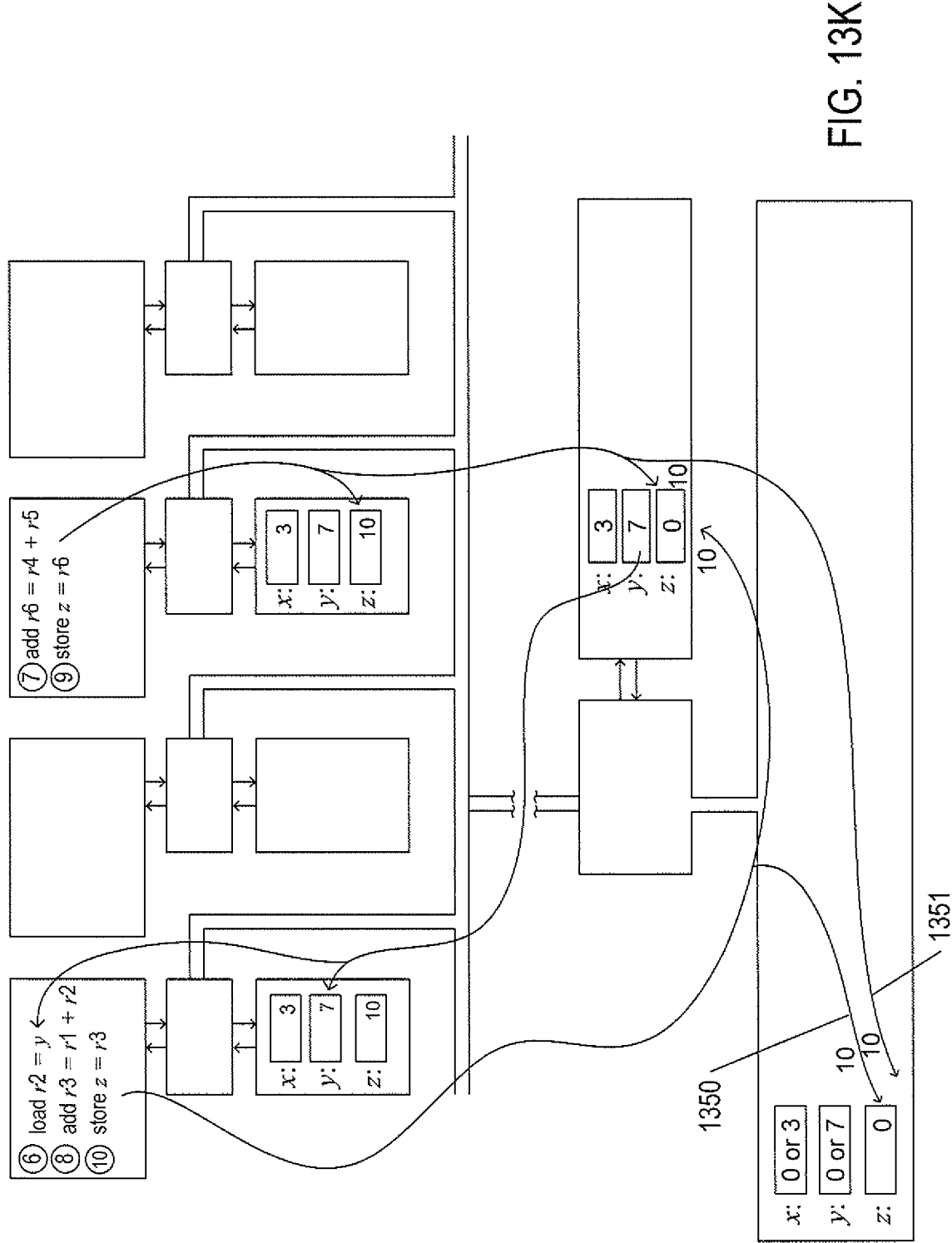

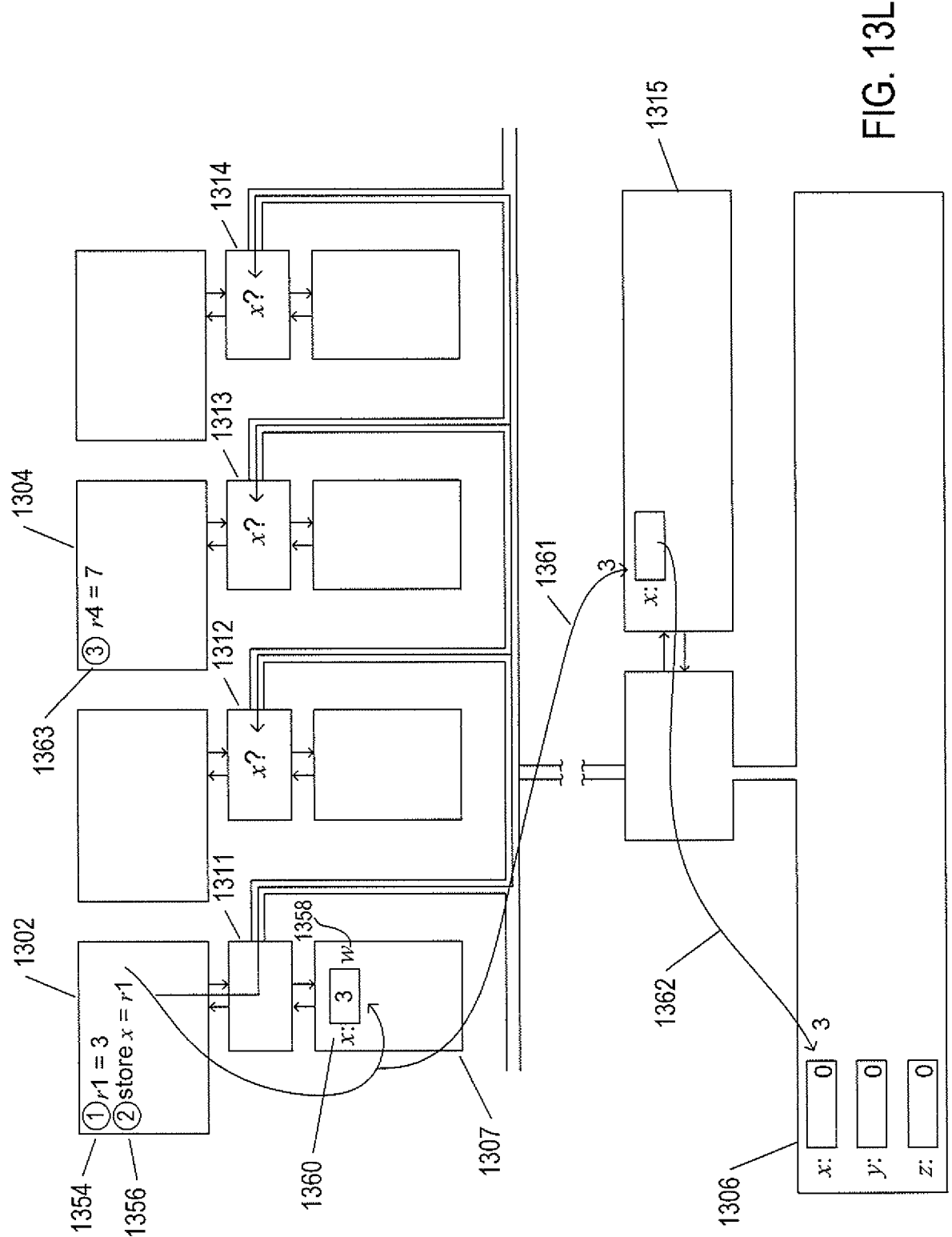

```
class resource_lock
{
private:
        int count;                          ──1422
public:                                 ──1424
        resource_lock(int maxUsage);
        bool getResource();    ──────1426
        void returnResource();  ──────1428
};
```
1420

```
resource_lock::resource_lock(int maxUsage)
{
        count = maxUsage;    ──1432
}
```
1430

```
bool resource_lock::getResource()
{
        int current;     ──1436
        do
        {
                current = count;    ──1440
                if (current < 1) return false;
        } while (!compare_and_swap(&count, current, current − 1));
        return true;
}
```
1434, 1438

```
void resource_lock::returnResource()
{
        atomic_increment(&count);
}
```
1442

FIG. 14B

```
typedef union _LocalCounterValue {
    struct {
        int32 totalCredits;
        int32 refCount;
    };
    vmk_atomic64 _atomic;
} LocalCounterValue;
```
1540

```
typedef union _GlobalCounterValue {
    struct {
        int32 globalReferences;
        int32 usedReferences;
    };
    vmk_atomic64 _atomic;
} GlobalCounterValue;
```
1542

```
typedef struct _LocalCounter {
    LocalCounterValue counter __attribute__((aligned(CACHELINE_SIZE)));
} LocalCounter;

typedef struct _SMPReference {
    LocalCounter      *slots;
    SP_SpinLock       *lock;
    GlobalCounterValue globalCounter;
    int32             maxRefCount;
    int32             numSlots;
} SMPReference;
```
1544

```
#define SMPREF_REFINC (1LL << 32)

static INLINE LocalCounter *
SMPRefGetSlot(SMPReference *ref, uint32 slot)
{
    ASSERT(slot < (uint32)ref->numSlots);
    return &ref->slots[slot];
}
```

FIG. 15E

```
static INLINE Bool SMPRefAdd(SMPReference *ref, uint32 slot, Bool lockHeld)  ─── 1554
{
    Bool success = TRUE;  ─── 1566
    LocalCounterValue curVal;
    LocalCounter *lCounter = SMPRefGetSlot(ref, slot);  ─── 1556 curVal._atomic = vmk_AtomicReadAdd64(&lCounter->counter._atomic,  ─── 1558
        SMPREF_REFINC);

if ((curVal.refCount < 0) || (curVal.refCount >= curVal.totalCredits)) {  ─── 1560
        if (!lockHeld) {
            SP_Lock(ref->lock);
        } if (((ref->globalCounter.globalReferences +
            ref->globalCounter.usedReferences) > ref->maxRefCount) ||
            !SMPRefExpandLocalReferenceLimit(ref, lCounter, 1)) {   ─── 1564 vmk_AtomicReadAdd64(&lCounter->counter._atomic, -SMPREF_REFINC);
            success = FALSE;
        } if (!lockHeld) {
            SP_Unlock(ref->lock);
        }
    } return success;
}
```

```
static INLINE void SMPRefRemove(SMPReference *ref, uint32 slot, Bool lockHeld)  ⎯ 1568
{
    LocalCounterValue curVal;
    LocalCounter *lCounter = SMPRefGetSlot(ref, slot);  ⎯ 1570 curVal._atomic = vmk_AtomicReadAdd64(&lCounter->counter._atomic,  ⎯ 1572
         -SMPREF_REFINC);

if (curVal.refCount <= 0) { if (!lockHeld) {
            SP_Lock(ref->lock);
        }

SMPRefRemoveInt(ref, lCounter);          ⎬ 1574 if (!lockHeld) {
            SP_Unlock(ref->lock);
        }

}
}
```

(bracket 1550 encompasses the SMPRefRemove function)

```
Bool SMPRefInitialize(SMPReference *ref,
SP_SpinLock *lock,
int numSlots,
int maxRefCount)
{
    ASSERT_ON_COMPILE(sizeof(LocalCounter) == CACHELINE_SIZE);

ref->maxRefCount = maxRefCount;
    ref->numSlots = numSlots;
    ref->globalCounter.globalReferences = 0;
    ref->globalCounter.usedReferences = 0;
    ref->lock = lock;

ref->slots = (LocalCounter *)SCSIAlign(sizeof(LocalCounter) * numSlots,
         CACHELINE_SIZE,
         SCSI_BZERO);
    return (ref->slots != NULL);
} void SMPRefFree(SMPReference *ref)
{
    SCSIFree(ref->slots);
}
```

FIG. 15G

```
uint32 SMPRefClaimUnusedReferences(SMPReference *ref, LocalCounter *lCounter)
{
    LocalCounterValue curVal, newVal;
    int32 availableRef;

ASSERT(SP_IsLocked(ref->lock));

do { curVal._atomic = vmk_AtomicRead64(&lCounter->counter._atomic);

availableRef = curVal.totalCredits - curVal.refCount;

if ((availableRef <= 0) || (curVal.totalCredits == 0)) {
            return curVal.totalCredits;
        } if (availableRef > curVal.totalCredits) {
            availableRef = curVal.totalCredits;
        } newVal.refCount = curVal.refCount;
        newVal.totalCredits = curVal.totalCredits - availableRef;

} while SMPREF_CAS_LOOP_LOCAL(curVal, newVal, lCounter);

return newVal.totalCredits;
}
```

FIG. 15H

```
uint32 SMPRefTransferActiveReferences(LocalCounter *lCounter)
{
    LocalCounterValue curVal, newVal;
    int32 availableRef;

do { curVal._atomic = vmk_AtomicRead64(&lCounter->counter._atomic);

availableRef = curVal.refCount;

if (availableRef > curVal.totalCredits) {
            availableRef = curVal.totalCredits;
        } if (availableRef <= 0) {
            return 0;
        } newVal.refCount = curVal.refCount - availableRef;
        newVal.totalCredits = curVal.totalCredits - availableRef;

} while SMPREF_CAS_LOOP_LOCAL(curVal, newVal, lCounter);

return availableRef;
}
```

FIG. 15I

```
Bool SMPRefExpandLocalReferenceLimit(SMPReference *ref,
LocalCounter *lCounter,
int delta)
{
    int i;

ASSERT(SP_IsLocked(ref->lock));
    ASSERT(delta > 0);

if (ref->maxRefCount -
        ref->globalCounter.usedReferences -
        ref->globalCounter.globalReferences >= delta) { ref->globalCounter.usedReferences += delta;
        ASSERT(ref->globalCounter.usedReferences <= ref->maxRefCount);
        vmk_AtomicReadAdd64(&lCounter->counter._atomic, delta);
        return TRUE;
    } ref->globalCounter.usedReferences = 0;
    for (i = 0; i < ref->numSlots; i++) {
        int totalRef = SMPRefClaimUnusedReferences(ref, &ref->slots[i]);
        ASSERT(totalRef >= 0);
        ref->globalCounter.usedReferences += totalRef;
        ASSERT(ref->slots[i].counter.totalCredits <=
               ref->globalCounter.usedReferences);
        ASSERT(ref->globalCounter.usedReferences <= ref->maxRefCount);
        ASSERT(ref->globalCounter.usedReferences >= 0);
    } if (ref->maxRefCount -
        ref->globalCounter.usedReferences -
        ref->globalCounter.globalReferences < delta) { delta = ref->maxRefCount -
            ref->globalCounter.usedReferences -
            ref->globalCounter.globalReferences;
    } if (delta > 0) {
        ref->globalCounter.usedReferences += delta;
        ASSERT(ref->globalCounter.usedReferences <= ref->maxRefCount);
        // Increase the local limit for the current slot by delta
        vmk_AtomicReadAdd64(&lCounter->counter._atomic, delta);
        return TRUE;
    } return FALSE;
}
```

FIG. 15J

```
void SMPRefClaimActiveReferences(SMPReference *ref)
{
    int i;

ASSERT(SP_IsLocked(ref->lock));

for (i = 0; i < ref->numSlots; i++) {
        int refReduction = SMPRefTransferActiveReferences(&ref->slots[i]);
        ref->globalCounter.globalReferences += refReduction;
        ref->globalCounter.usedReferences -= refReduction;
    }

ASSERT(ref->globalCounter.globalReferences >= 0);
    ASSERT(ref->globalCounter.usedReferences >= 0);
    ASSERT(ref->globalCounter.usedReferences <= ref->maxRefCount);
}
```

FIG. 15K

```
void SMPRefTransferNegativeActiveReferences(SMPReference *ref,
LocalCounter *lCounter)
{
    LocalCounterValue curVal, newVal;
    int32 availableRef;

ASSERT(SP_IsLocked(ref->lock));

do { curVal._atomic = vmk_AtomicRead64(&lCounter->counter._atomic);

availableRef = curVal.refCount;

if (availableRef >= 0 || (ref->globalCounter.globalReferences == 0)) {
            return;
        } if (-availableRef > ref->globalCounter.globalReferences) {
            availableRef = -ref->globalCounter.globalReferences;
            newVal.refCount = curVal.refCount - availableRef;
        }
        else {
            newVal.refCount = 0;
        } newVal.totalCredits = curVal.totalCredits;

} while SMPREF_CAS_LOOP_LOCAL(curVal, newVal, lCounter);

ref->globalCounter.globalReferences += availableRef;
}
```

FIG. 15L

```
void SMPRefClaimUnderReferences(SMPReference *ref)
{
    int i;

ASSERT(SP_IsLocked(ref->lock));

ref->globalCounter.usedReferences = 0;

for (i = 0; i < ref->numSlots; i++) {
        int removedRef = SMPRefClaimUnusedReferences(ref, &ref->slots[i]);
        ASSERT(removedRef >= 0);
        ref->globalCounter.usedReferences += removedRef;
        SMPRefTransferNegativeActiveReferences(ref, &ref->slots[i]);
        ASSERT(ref->slots[i].counter.totalCredits <=
               ref->globalCounter.usedReferences);
        ASSERT(ref->globalCounter.usedReferences <= ref->maxRefCount);
        ASSERT(ref->globalCounter.usedReferences >= 0);
    }

ASSERT(ref->globalCounter.globalReferences >= 0);
    ASSERT(ref->globalCounter.usedReferences >= 0);
    ASSERT(ref->globalCounter.usedReferences <= ref->maxRefCount);
} void
SMPRefRemoveInt(SMPReference *ref, LocalCounter *lCounter)
{
    ASSERT(SP_IsLocked(ref->lock));

if (ref->globalCounter.globalReferences == 0) {
        SMPRefClaimActiveReferences(ref);
    } if (ref->globalCounter.globalReferences > 0) {
        LocalCounterValue curVal;
        curVal._atomic = vmk_AtomicReadAdd64(&lCounter->counter._atomic,
            SMPREF_REFINC);
        ASSERT(ref->globalCounter.globalReferences != 0);
        ref->globalCounter.globalReferences -= 1;

if (curVal.refCount >= -1) {
            return;
        }
    }

SMPRefClaimUnderReferences(ref);
}
```

FIG. 15M

NON-BLOCKING FLOW CONTROL IN MULTI-PROCESSING-ENTITY SYSTEMS

TECHNICAL FIELD

The current document is directed to flow-control of shared computational resources in multi-processor computer systems and multi-core-processor-based systems and, in particular, to an efficient, non-blocking flow-control mechanism that avoids high levels of contention for shared memory locations among cache controllers and blocking of parallel execution progress of threads and processes executing within multi-processing-entity computer systems.

BACKGROUND

Early computer systems sequentially executed programs, one at a time, without the benefit of operating systems, compilers for high-level languages, and access to remote computational resources through networking. Over the course of the past 60 years, computers evolved first to robust, operating-system-controlled, single-processor computer systems that supported concurrent execution of multiple programs and electronic data exchange with remote computers and data-storage appliances through electronic communications and media. The development of distributed operating systems and robust technologies for synchronizing parallel execution of programs then led to computer systems with multiple processors and to distributed computing systems in which multiple computer systems were aggregated to provided distributed concurrent and simultaneous execution of multiple programs. With further improvement to both hardware platforms and operating-system and virtualization-layer technologies, efficient multi-core processors were developed with hierarchical layers of memory caches to further advance the economic and computational efficiencies of parallel computing. Multi-core-processor integrated circuits and chip sets feature increasingly large numbers of processor cores, along with hierarchical memory caches and a great deal of additional support for parallel execution of many execution threads and processes, including hardware threads.

As computer systems have evolved to incorporate ever greater levels of hardware and system-software support for highly parallel execution of large numbers of threads and processes, the cost per execution cycle has plummeted while the instruction-execution bandwidth has dramatically risen. This, in turn, has provided the economies of scale to make cloud-computing not only possible, but an increasingly dominant platform for providing computational bandwidth to organizations and individuals. Nonetheless, despite the advances and improvements in parallel computing, remaining inefficiencies in parallel-computing systems, such as symmetric-multi-processor computer systems ("SMP computer systems") continue to be identified and eliminated. Designers, developers, vendors, and users of computer systems continue to seek methods and technologies to increase the efficiencies, computational bandwidths, and computing and data-storage capacities of parallel computer systems.

SUMMARY

The current document is directed to an efficient and non-blocking mechanism for flow control within a multi-processor or multi-core processor with hierarchical memory caches. Traditionally, a centralized shared-computational-resource access pool, accessed using a locking operation, is used to control access to a shared computational resource within a multi-processor system or multi-core processor. The efficient and non-blocking mechanism for flow control, to which the current document is directed, distributes local shared-computational-resource access pools to each core of a multi-core processor and/or to each processor of a multi-processor system, avoiding significant computational overheads associated with cache-controller contention-control for a traditional, centralized access pool and associated with use of locking operations for access to the access pool.

BRIEF DESCRIPTION OF THE DRAWINGS

FIGS. 14A-B illustrate a common approach to flow control of a resource in a multi-processing-entity computer system.

FIGS. 15A-M illustrate one implementation of an efficient, non-blocking flow-control mechanism that ameliorates the contention-control overheads suffered by the traditional flow-control mechanism discussed above with reference to FIGS. 14A-C.

DETAILED DESCRIPTION OF EMBODIMENTS

The current document is directed to an efficient and non-blocking flow-control mechanism for a multi-processing-entity computational environment, such as a multi-core processor and/or multi-processor system with hierarchical memory caches. In a first subsection below, an overview of computer systems and computer architecture is provided, with reference to FIGS. 1-12. A second subsection discusses problems associated with shared memory in multi-processing-entity computational environments. In a third subsection, the efficient and non-blocking flow-control mechanism to which the current document is directed is described, in detail, with reference to FIGS. 14A-15J.

Overview of Computer Systems and Computer Architecture

Figure 1:
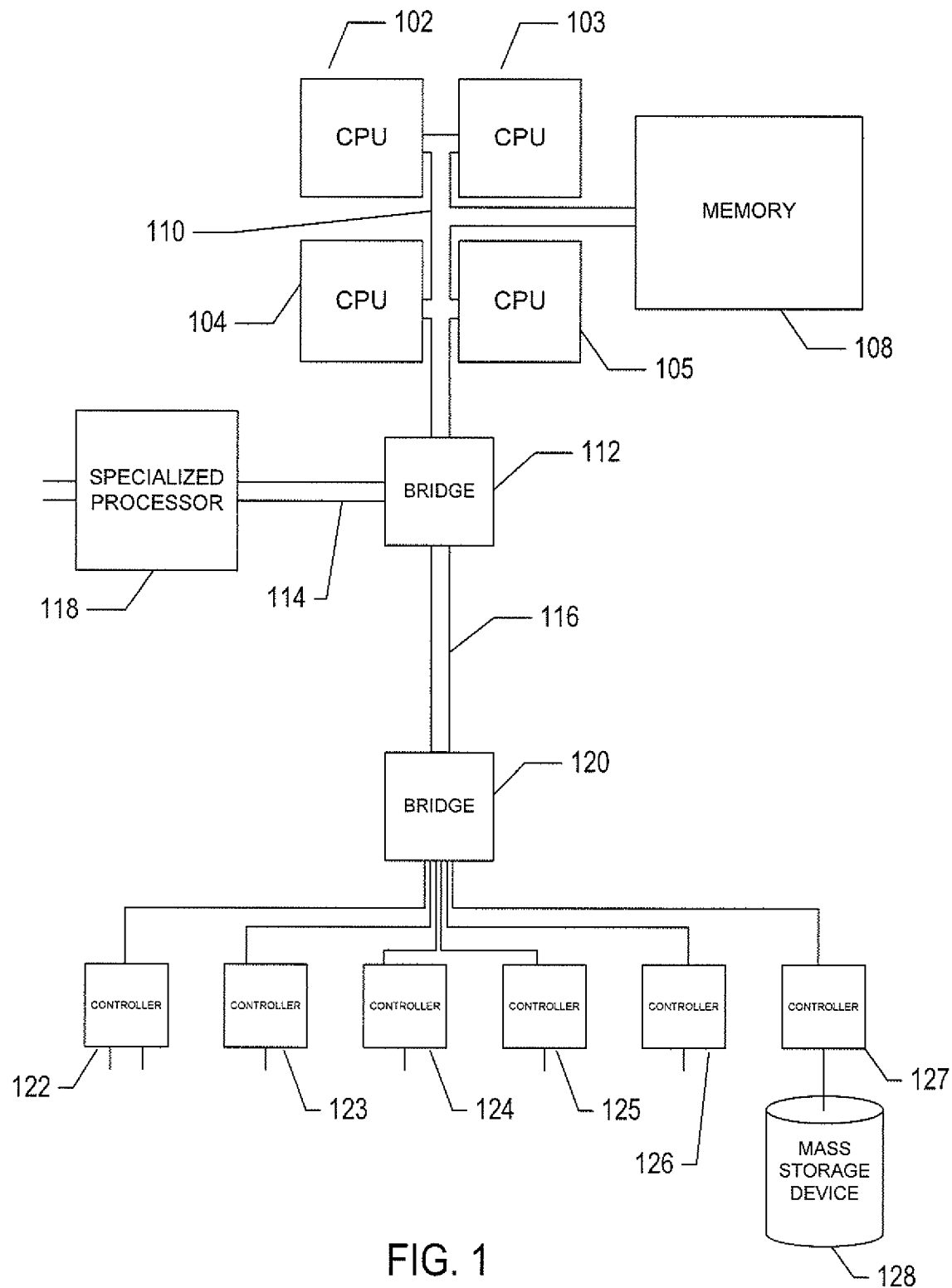
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
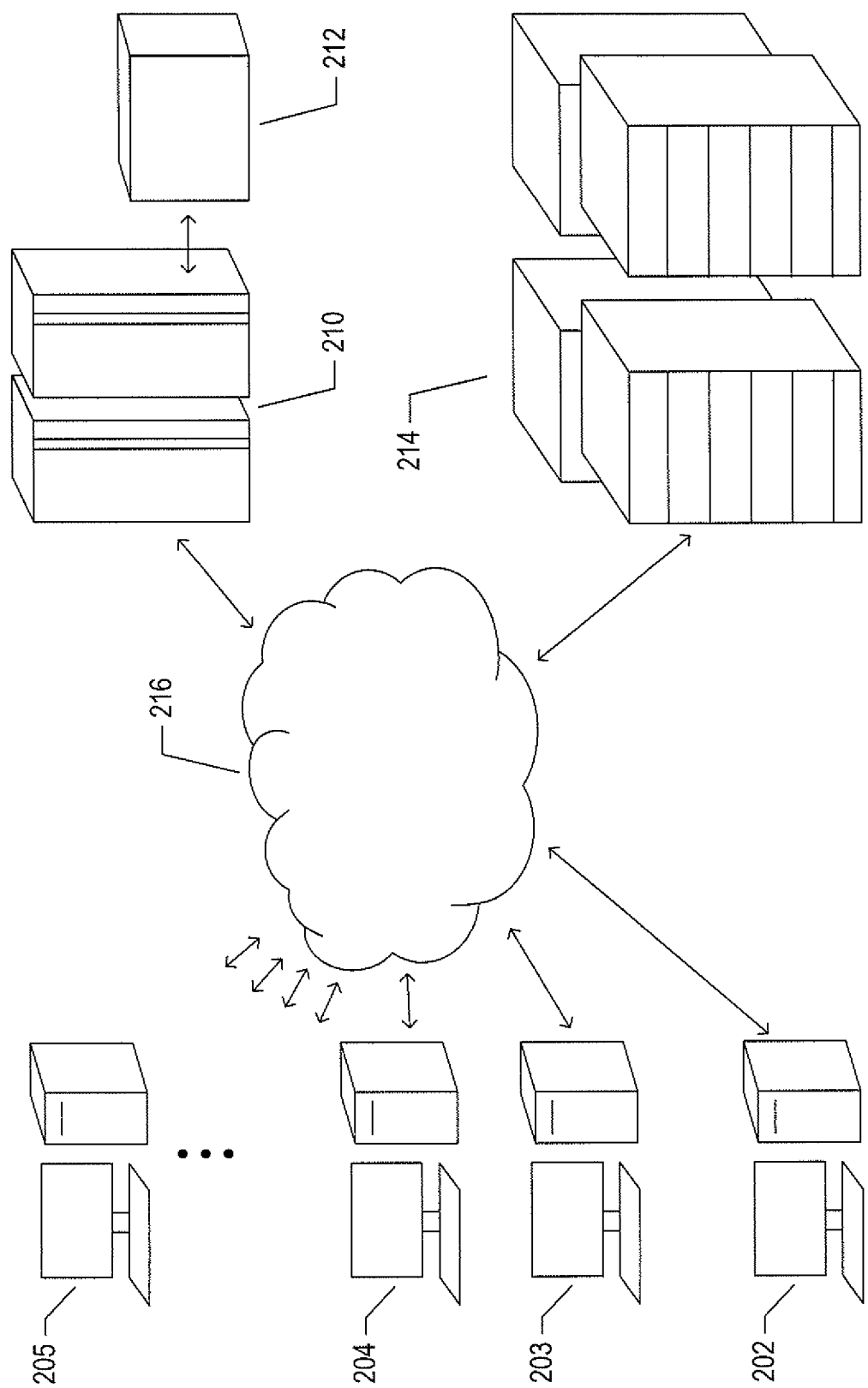
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computer systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
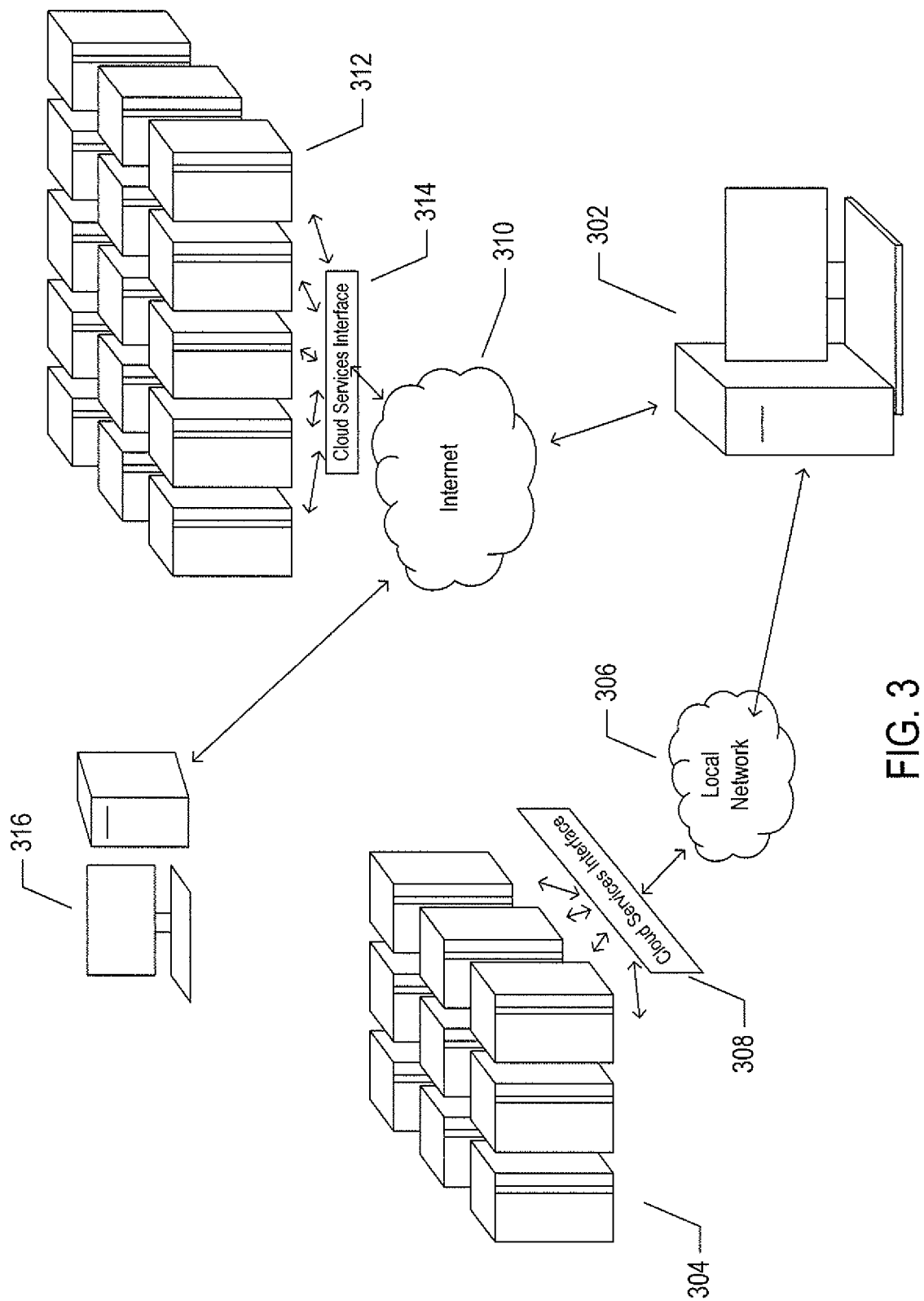
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Figure 4:
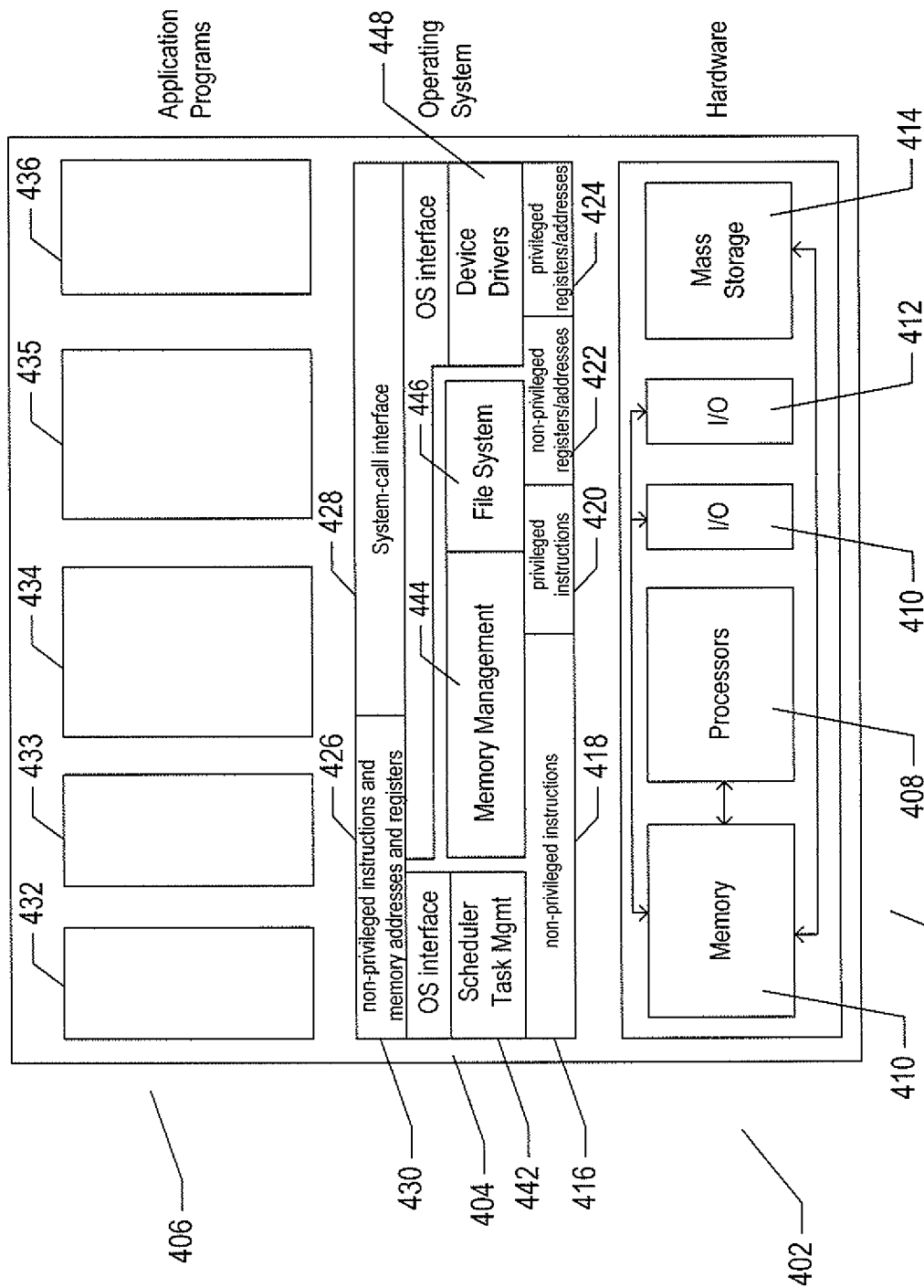
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
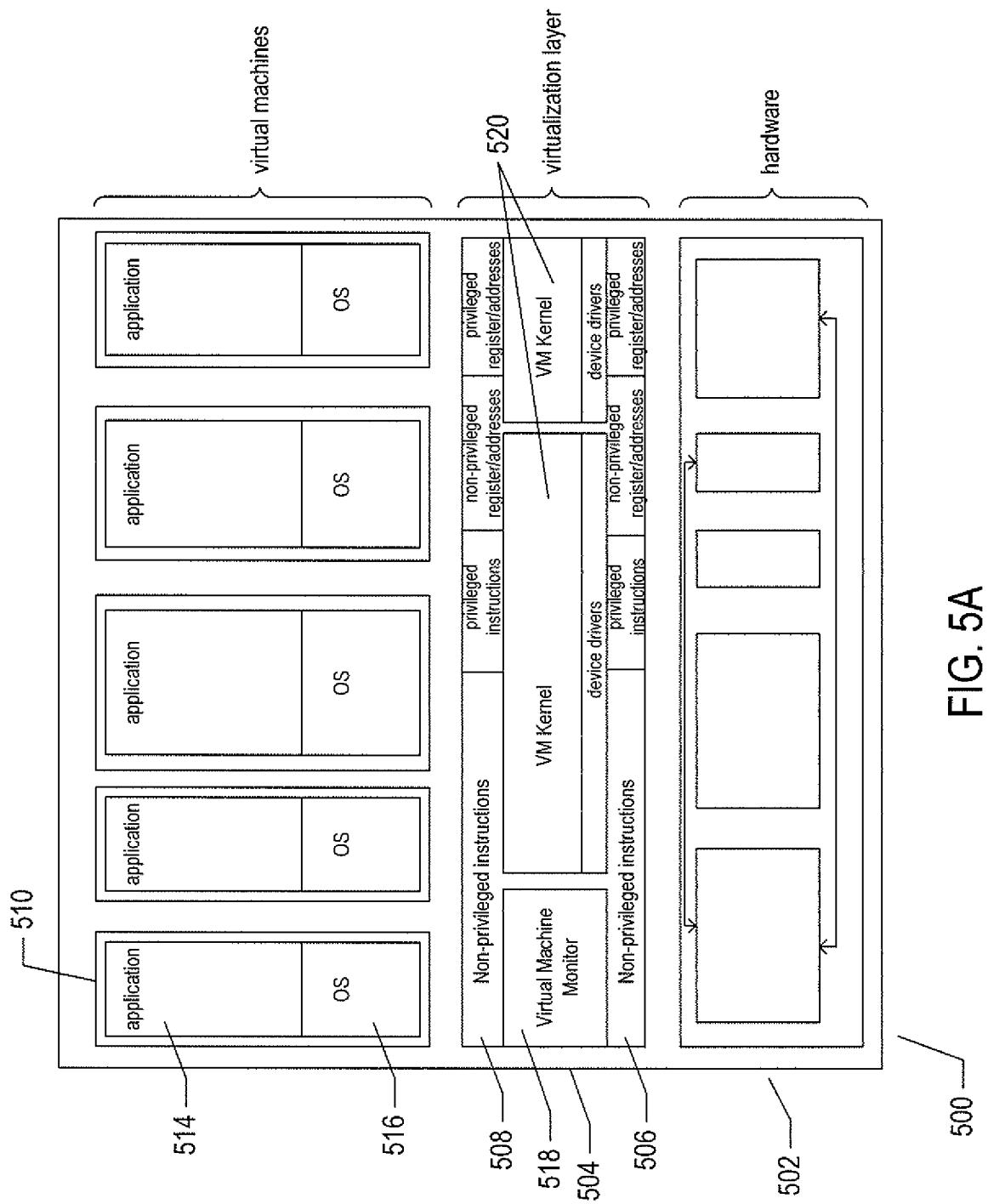
FIGS. 5A-B illustrate two types of virtual machine and virtual-machine execution environments.
Figure 5B:
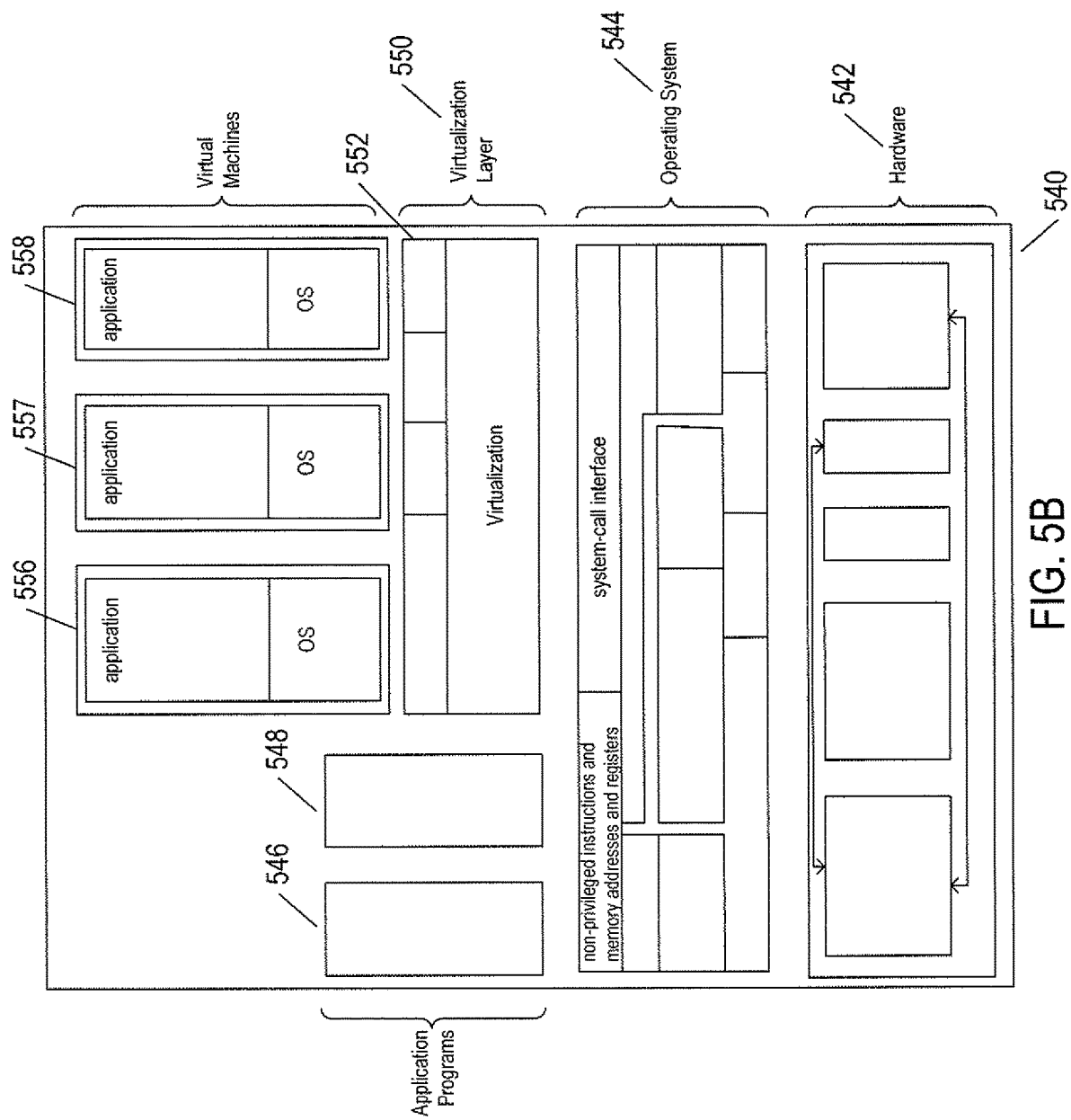

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, similar to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer, such as power supplies, controllers, processors, busses, and data-storage devices.

Figure 6A:
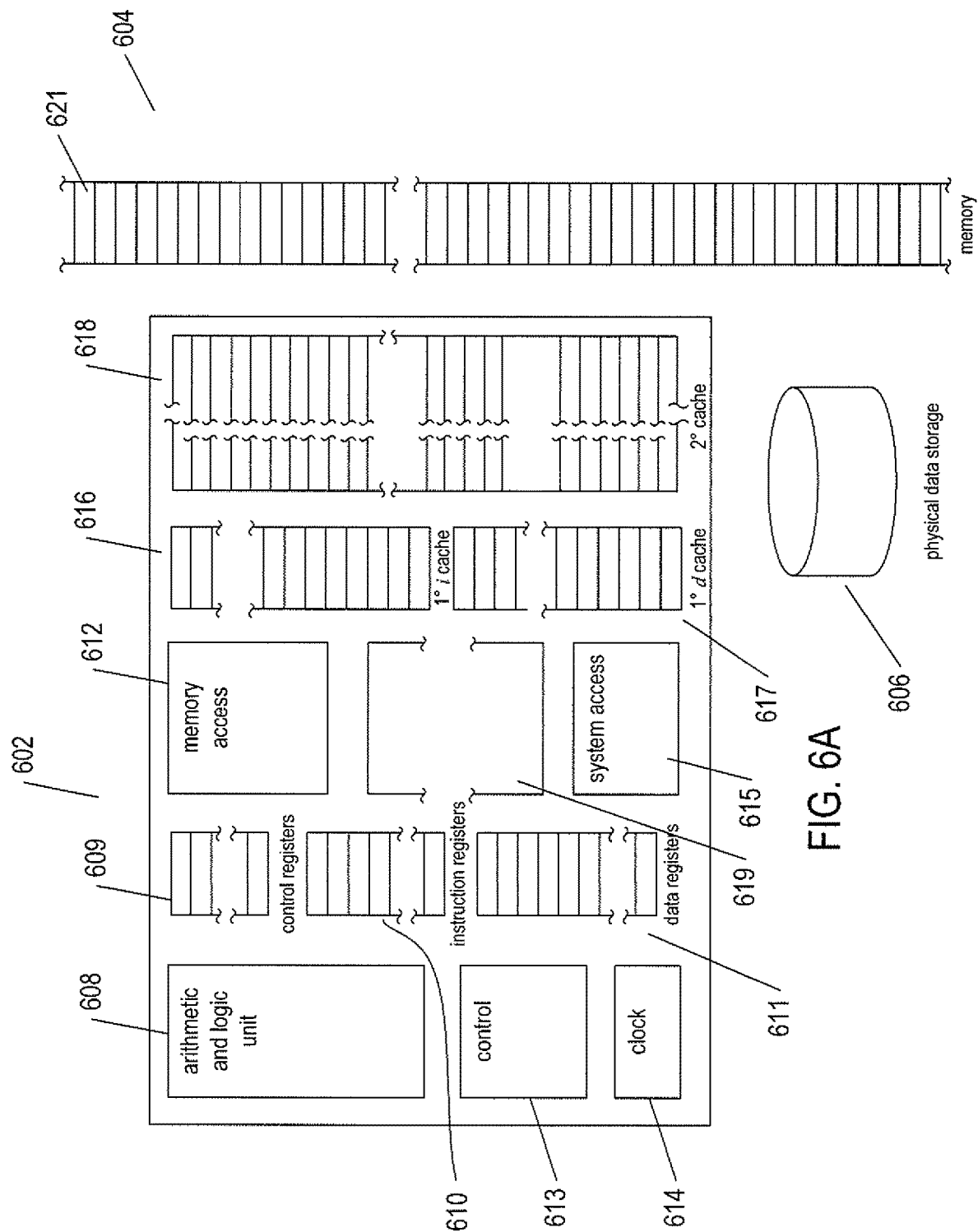
FIGS. 6A-B illustrate a hypothetical computer system.
Figure 6B:
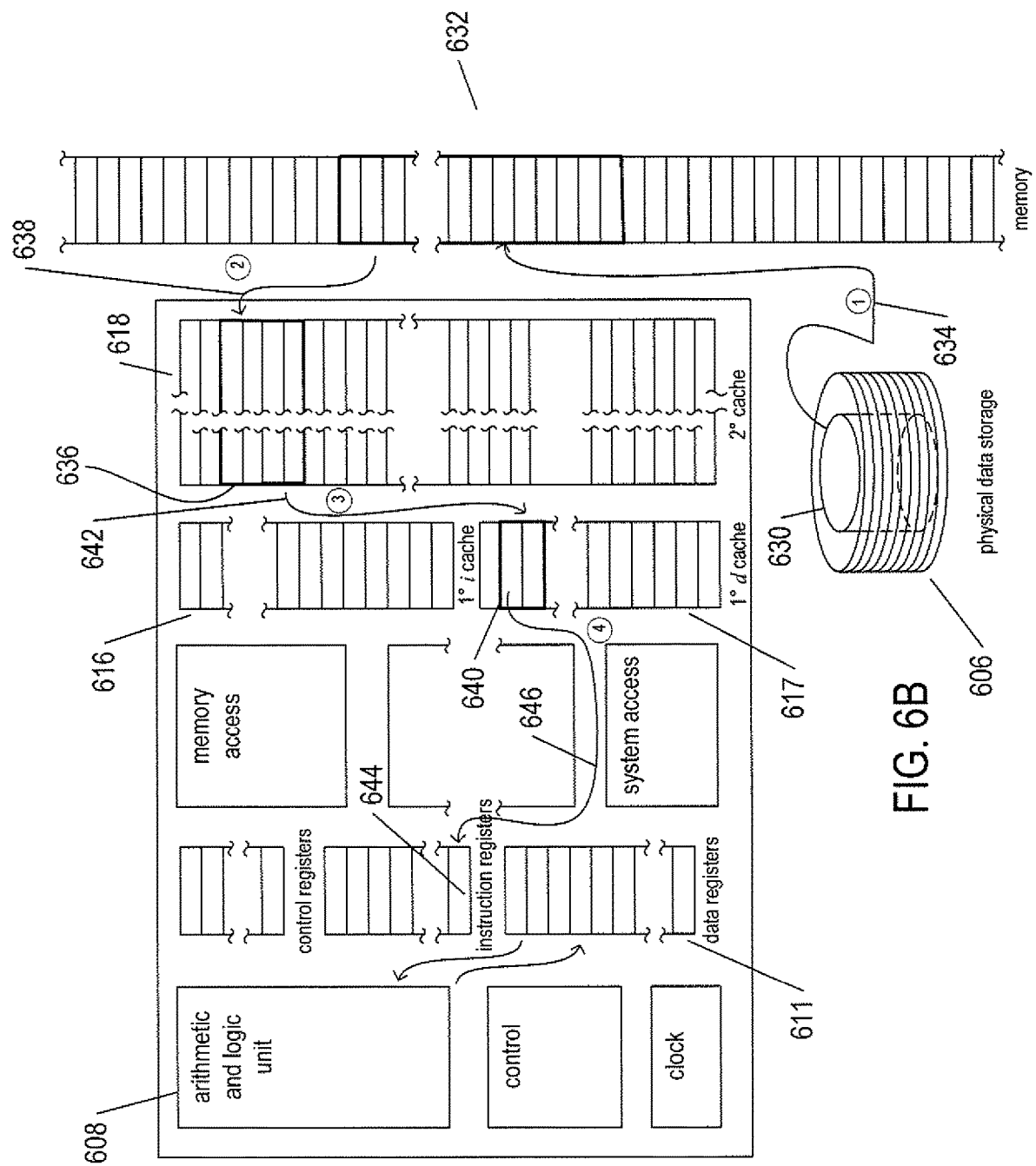

FIGS. 6A-C illustrate a hypothetical computer system. The hypothetical system includes a processor 602, a memory 604, and a physical data-storage device 606. The processor includes an arithmetic and logic unit 608, control registers 609, instruction registers 610, data registers 611, a memory-access controller 612, a control unit 613 that coordinates operation and interoperation of the various processor components, a hardware clock 614, a system-access controller 615, a primary instruction cache 616, a primary data cache 617, a secondary combined data and instruction cache 618, and other components represented by the rectangle of indeterminate size 619 included in the block diagram of the processor 602. The memory 604 is represented as a linear address space, with each cell or element, such as cell 621, representing a unit of memory storage, such as a 64-bit word.

FIG. 6B illustrates, using the examples system shown in FIG. 6A, how data and instructions migrate from the physical data-storage device through memory into processor caches and registers in order to be executed and operated on, respectively, by the processor. In general, both data and instructions are stored in the non-volatile physical data-storage device 606. Data blocks and sectors, represented in FIG. 6B by a thin cylinder 630 comprising tracks read together by a multi-read disk head from multiple disk platters, is transferred under processor control to one or more blocks or pages of memory 632. The data blocks contain computer instructions and data. The movement of instructions and data from the physical data-storage device to memory is represented by a first curved arrow 634 in FIG. 6B. In order for instructions to be executed and data to be operated on, the instructions and data are moved from memory to the processor. First, assuming the memory block or page 632 contains instructions, the block of instructions is moved to the secondary cache 636, as represented by curved arrow 638. A portion of the instructions is moved from the secondary cache to the primary instruction cache 640, as represented by curved arrow 642. A particular instruction is executed by moving the instruction from the primary cache to an instruction register 644, as represented by arrow 646. The instruction is then fetched from the instruction register by the arithmetic and logic unit 608 and executed. Instructions that produce data values result in storage of computed data values in data registers. Similarly, data migrates from the physical data-storage device to memory, from memory to the secondary cache, from the secondary cache to the primary data cache 617, and from the primary data cache to the data registers 611. The processor operates on the data registers, as controlled by instructions fetched and executed from the instruction registers.

The instruction and data registers represent the most expensive and most quickly accessed data-storage units within the computer system. The next most expensive and next most quickly accessed storage components are the primary instruction cache 616 and the primary data cache 617. The secondary cache 618 is somewhat less expensive and more slowly accessed. The memory 632 is much less expensive and much less quickly accessed by the processor, and the physical data-storage device 606 is the least expensive data-storage component, on a per-instruction or per-data-unit basis, and is much more slowly accessed by the computer system. The processor caches and registers are organized so that instructions that are repetitively executed within a short span of time, such as instructions within a tight loop of a routine, may reside in the instruction registers or the instruction registers combined with the primary instruction cache, in order to facilitate rapid iterative execution of the loop. Similarly, instructions of a longer, but repetitively executed routine tend to reside in the primary instruction cache or in a combination of the primary instruction cache and the secondary cache, in order to avoid the need to repetitively access instructions of the routine from memory. In similar fashion, the instructions of a large program or software component may reside, over long periods of time, within memory 632, rather than being repetitively read into memory from the physical data-storage device. In modem computer systems, the address space corresponding to memory is virtual, having a much larger virtual length than the actual length of the physical address space represented by physical memory components, with data transferred back and forth from the physical data-storage device and memory, under processor control, in order to support the illusion of a much larger virtual address space than can be contained, at any particular point in time, in the smaller physical memory.

Any particular component or subsystem of the simple computer system may, over any given period of time, represent a computational bottleneck that limits the throughput of the computer system. For example, were the computer system to execute a tiny routine that can be completely stored within the instruction registers and that operates on only a few data items that can be stored in the data registers, the computational throughput would likely be limited by the speed of the arithmetic and logic unit and various internal communication pathways within the processor. By contrast, were the computing system executing a modestly sized program that could be stored within the secondary cache 618 and that operated on data that could be stored in either the primary data cache or a combination of the primary data cache and the secondary cache, the computational throughput of the computer system may be limited by the processor control components and internal busses or signal paths through which data is transferred back and forth between the caches and registers. When the computer system runs a multi-tasking operating system that, in turn, runs multiple routines on behalf of multiple users, requiring instructions and data to be constantly moved between memory and processor caches, the throughput of the computer system may well be constrained and governed by the speed of a memory bus through which instructions and data pass between the memory and the processor and the processor and memory. In certain cases, when very large amount of data are read in and modified from the physical data-storage device, the throughput of the computer system may be constrained by the speed of access to data within the physical data-storage device. In certain cases, the computational throughput may be limited by complex interactions between components while in other cases, computational throughput of the system may be limited by a single component or subsystem that represents a bottleneck within the computer system with respect to the tasks being carried out by the computer system. In large virtual data centers, many different components, subsystems, collections of discrete systems, networking infrastructure, and other subsystems and subcomponents may represent bottlenecks, under particular loads at particular times, within the complex, distributed virtual data centers.

Figure 7:
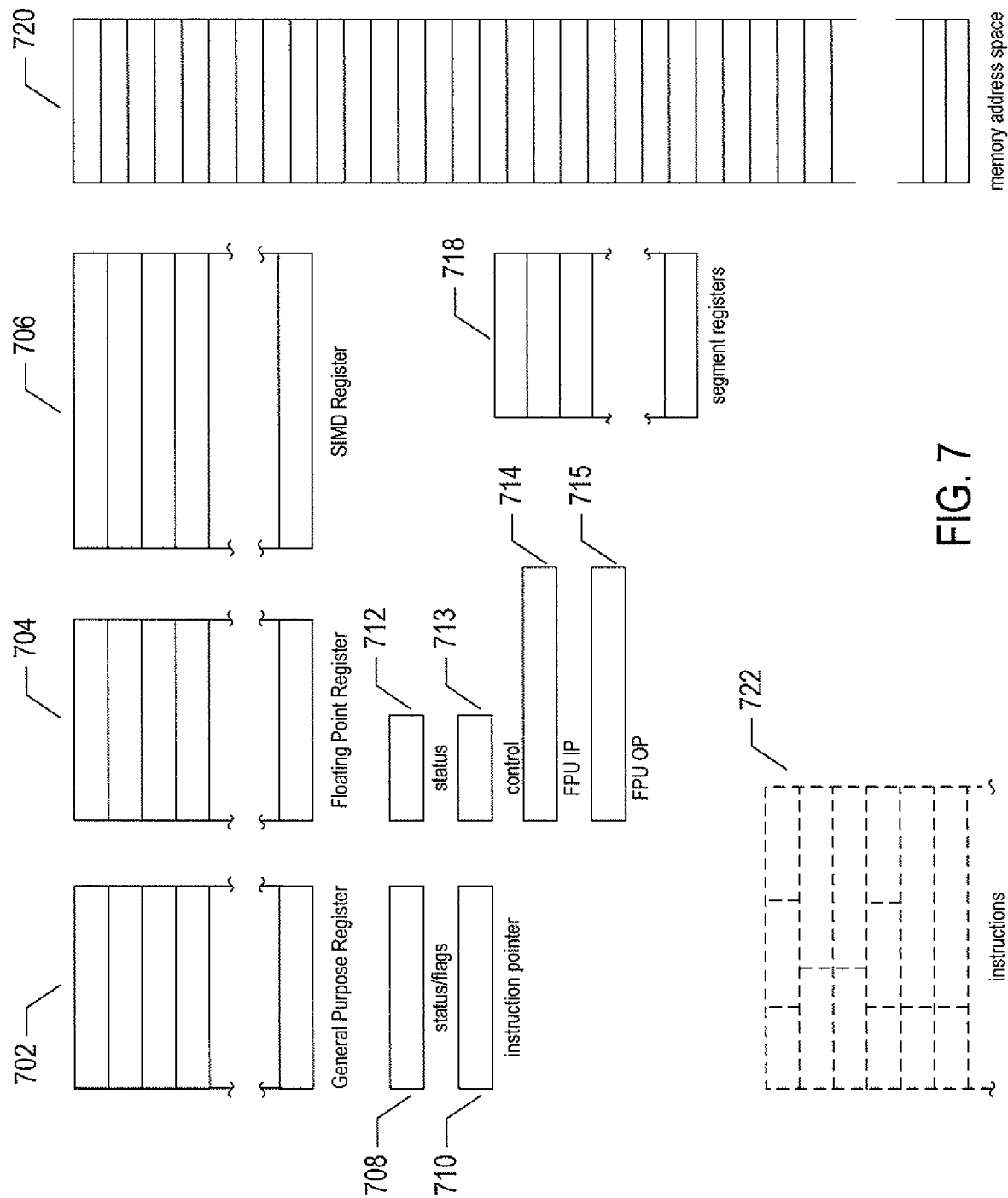
FIG. 7 illustrates an instruction-set architecture ("ISA") provided by a modern processor.

FIG. 7 illustrates an instruction-set architecture ("ISA") provided by a modern processor. The ISA commonly includes a set of general-purpose registers 702, a set of floating-point registers 704, a set of single-instruction-multiple-data ("SIMD") registers 706, a status/flags register 708, an instruction pointer 710, special status 712, control 713, and instruction-pointer 714 and operand 715 registers for floating-point instruction execution, segment registers 718 for segment-based addressing, a linear virtual-memory address space 720, and the definitions and specifications of the various types of instructions that can be executed by the processor 722. The length, in bits, of the various registers is generally implementation dependent, often related to the fundamental data unit that is manipulated by the processor when executing instructions, such as a 16-bit, 32-bit, or 64-bit word and/or 64-bit or 128-bit floating-point words. When a computational entity is instantiated within a computer system, the values stored in each of the registers and in the virtual memory-address space together comprise the machine state, or architecture state, for the computational entity. While the ISA represents a level of abstraction above the actual hardware features and hardware resources of a processor, the abstraction is generally not too far removed from the physical hardware. As one example, a processor may maintain a somewhat larger register file that includes a greater number of registers than the set of general-purpose registers provided by the ISA to each computational entity. ISA registers are mapped by processor logic, often in cooperation with an operating system and/or virtual-machine monitor, to registers within the register file, and the contents of the registers within the register file may, in turn, be stored to memory and retrieved from memory, as needed, in order to provide temporal multiplexing of computational-entity execution.

Figure 8:
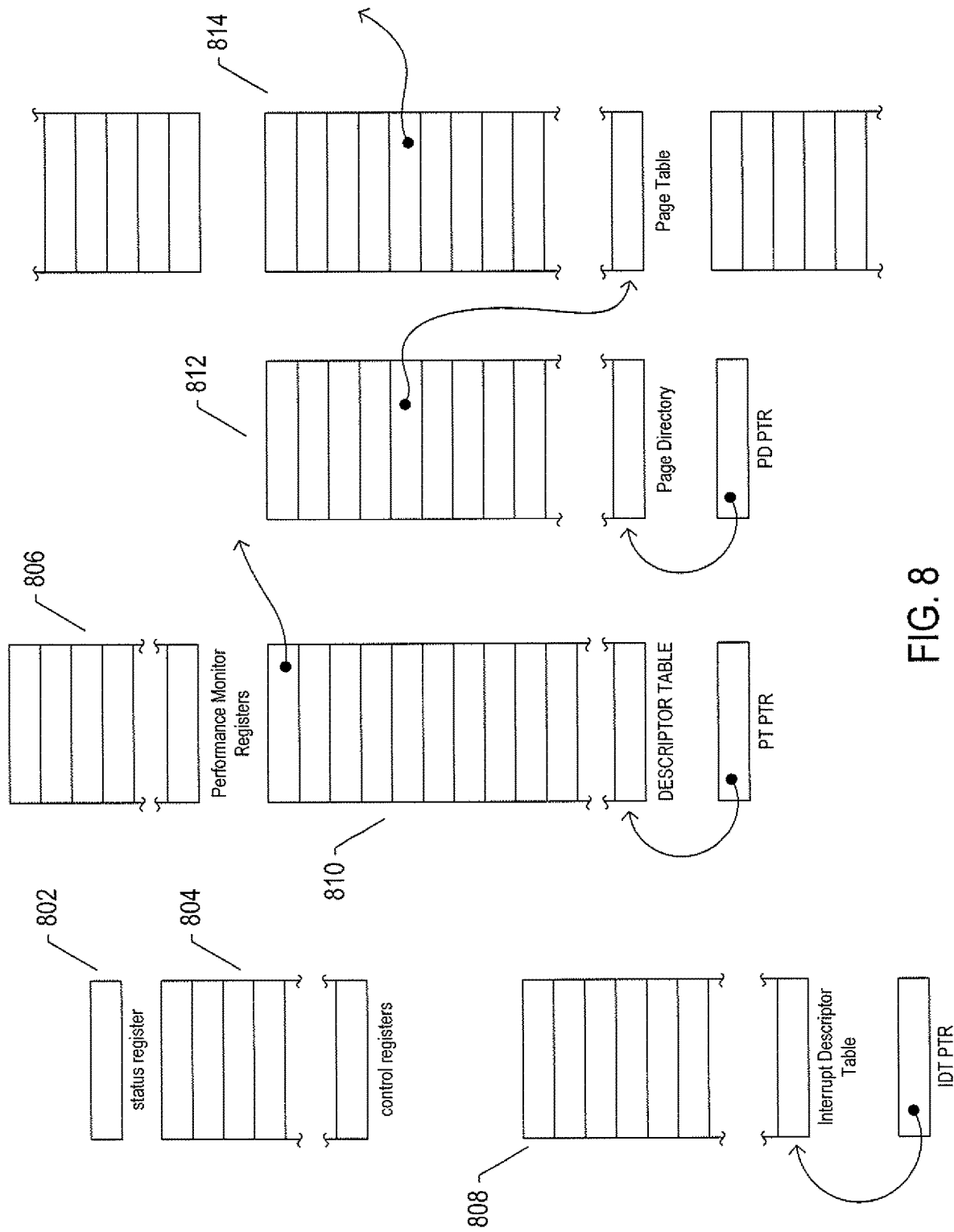
FIG. 8 illustrates additional processor features and resources used by virtual-machine monitors, operating systems, and other privileged control programs.

FIG. 8 illustrates additional processor features and resources used by virtual-machine monitors, operating systems, and other privileged control programs. These processor features, or hardware resources, can generally be accessed only by control programs operating at higher levels than the privilege level at which application programs execute. These system resources include an additional status register 802, a set of additional control registers 804, a set of performance-monitoring registers 806, an interrupt-descriptor table 808 that stores descriptions of entry points for interrupt handlers, the descriptions including references to memory descriptors stored in a descriptor table 810. The memory descriptors stored in the descriptor table may be accessed through references stored in the interrupt-descriptor table, segment selectors included in virtual-memory addresses, or special task-state segment selectors used by an operating system to store the architectural state of a currently executing process. Segment references are essentially pointers to the beginning of virtual-memory segments. Virtual-memory addresses are translated by hardware virtual-memory-address translation features that ultimately depend on a page directory 812 that contains entries pointing to page tables, such as page table 814, each of which, in turn, contains a physical memory address of a virtual-memory page.

Figure 9:
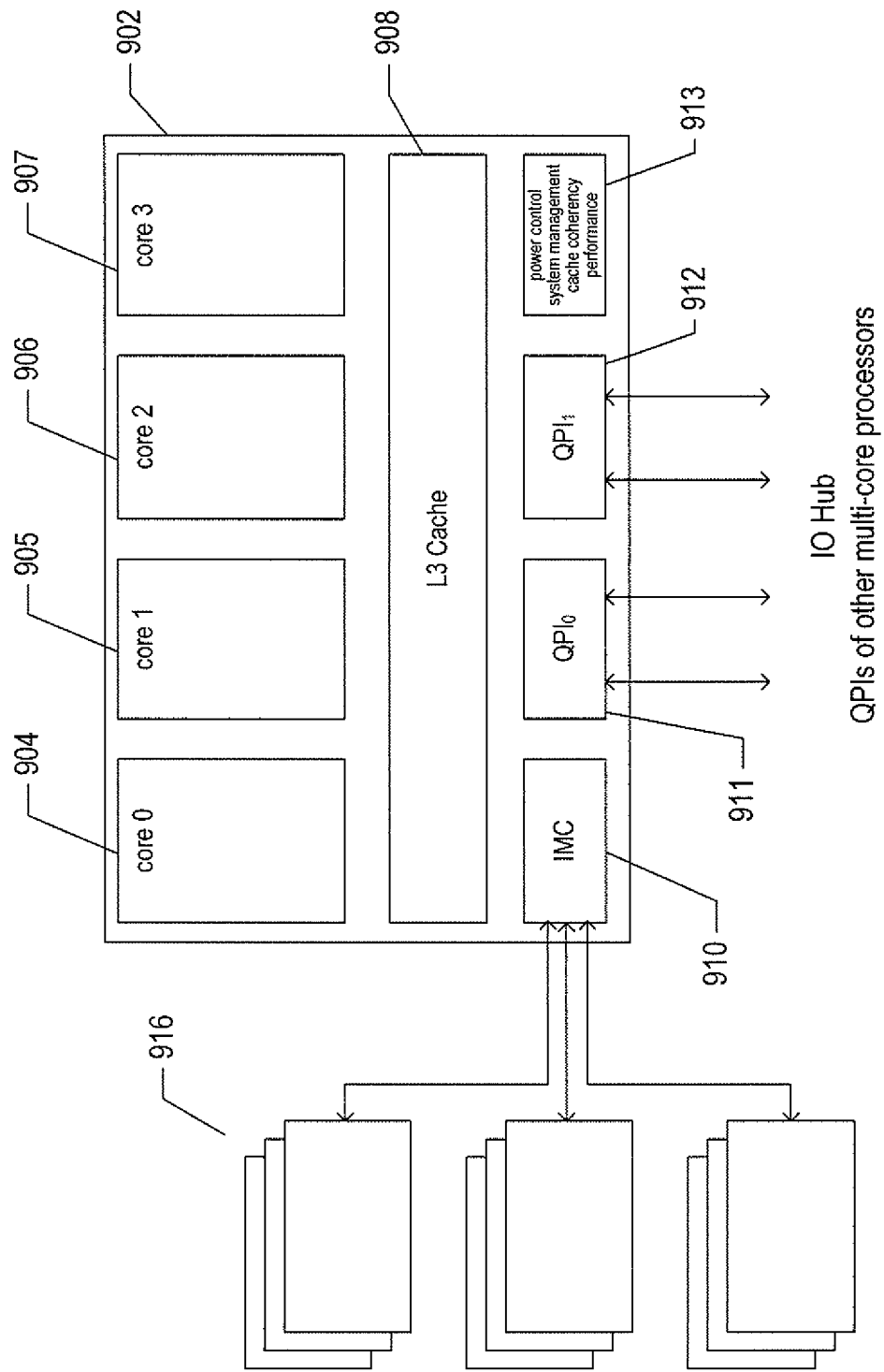
FIG. 9 illustrates an example multi-core processor.

FIG. 9 illustrates an example multi-core processor. The multi-core processor 902 includes four processor cores 904-907, a level-3 cache 908 shared by the four cores 904-907, and additional interconnect and management components 910-913 also shared among the four processor cores 904-907. Integrated memory controller ("IMC") 910 manages data transfer between multiple banks of dynamic random access memory ("DRAM") 916 and the level-3 cache ("L3 cache") 908. Two interconnect ports 911 and 912 provide data transfer between the multi-core processor 902 and an I/O hub and other multi-core processors. A final, shared component 913 includes power-control functionality, system-management functionality, cache-coherency logic, and performance-monitoring logic.

Each core in a multi-core processor is essentially a discrete, separate processor that is fabricated, along with all the other cores in a multi-core processor, within a single integrated circuit. As discussed below, each core includes multiple instruction-execution pipelines and internal L1 caches. In some cases, each core also contains an L2 cache, while, in other cases, pairs of cores may share an L2 cache. As discussed further, below, SMT-processor cores provide for simultaneous execution of multiple hardware threads. Thus, a multi-SMT-core processor containing four SMT-processors that each supports simultaneous execution of two hardware threads can be viewed as containing eight logical processors, each logical processor corresponding to a single hardware thread.

The memory caches, such as the L3 cache 908 and the multi-core processor shown in FIG. 9 is generally SRAM memory, which is much faster but also more complex and expensive than DRAM memory. The caches are hierarchically organized within a processor. The processor attempts to fetch instructions and data, during execution, from the smallest, highest-speed L1 cache. When the instruction or data value cannot be found in the L1 cache, the processor attempts to find the instruction or data in the L2 cache. When the instruction or data is resident in the L2 cache, the instruction or data is copied from the L2 cache into the L1 cache. When the L1 cache is full, instruction or data within the L1 cache is evicted, or overwritten, by the instruction or data moved from the L2 cache to the L1 cache. When the data or instruction is not resident within the L2 cache, the processor attempts to access the data or instruction in the L3 cache, and when the data or instruction is not present in the L3 cache, the data or instruction is fetched from DRAM system memory. Ultimately, data and instruction are generally transferred from a mass-storage device to the DRAM memory. As with the L1 cache, when intermediate caches are full, eviction of an already-resident instruction or data generally occurs in order to copy data from a downstream cache into an upstream cache.

Figure 10:
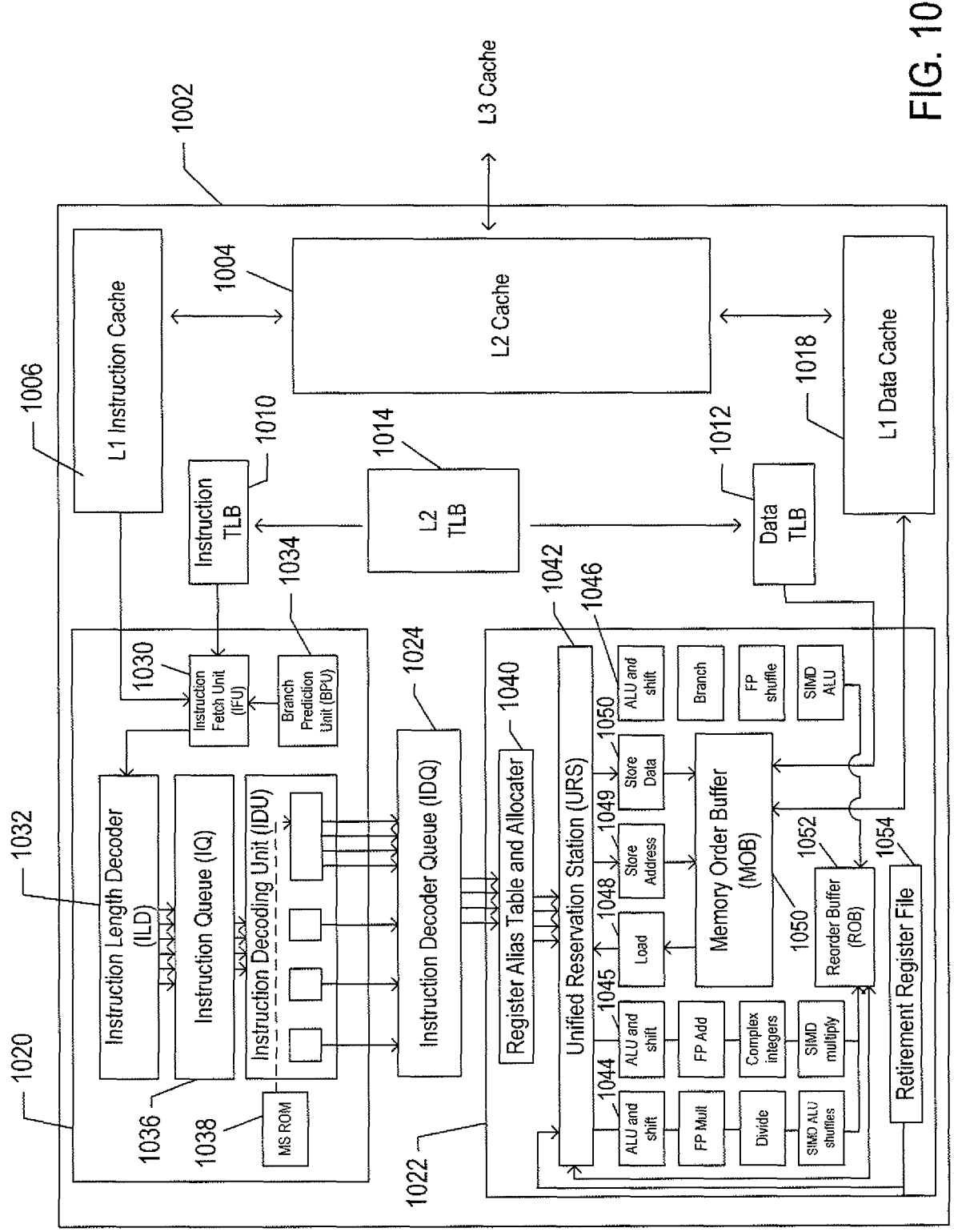
FIG. 10 illustrates the components of an example processor core.

FIG. 10 illustrates the components of an example processor core. As with the descriptions of the ISA and system registers, with reference to FIGS. 7 and 8, and with the description of the multi-core processor, with reference to FIG. 9, the processor core illustrated in FIG. 10 is intended as a high-level, relatively generic representation of a processor core. Many different types of multi-core processors feature different types of cores that provide different ISAs and different constellations of system registers. The different types of multi-core processors may use quite different types of data structures and logic for mapping virtual-memory addresses to physical addresses. Different types of multi-core processors may provide different numbers of general-purpose registers, different numbers of floating-point registers, and vastly different internal execution-pipeline structures and computational facilities.

The processor core 1002 illustrated in FIG. 10 includes an L2 cache 1004 connected to an L3 cache (908 in FIG. 9) shared by other processor cores as well as to an L1 instruction cache 1006 and an L1 data cache 1018. The processor core also includes a first-level instruction translation-lookaside buffer ("TLB") 1010, a first-level data TLB 1012, and a second-level, universal TLB 1014. These TLBs store virtual-memory translations for the virtual-memory addresses of instructions and data stored in the various levels of caches, including the L1 instruction cache, the L1 data cache, and L2 cache. When a TLB entry exists for a particular virtual-memory address, accessing the contents of the physical memory address corresponding to the virtual-memory address is far more computationally efficient than computing the physical-memory address using the previously described page directory and page tables.

The processor core 1002 includes a front-end in-order functional block 1020 and a back-end out-of-order-execution engine 1022. The front-end block 1020 reads instructions from the memory hierarchy and decodes the instructions into simpler microinstructions which are stored in the instruction decoder queue ("IDQ") 1024. The microinstructions are read from the IDQ by the execution engine 1022 and executed in various parallel execution pipelines within the execution engine. The front-end functional block 1020 include an instruction fetch unit ("IFU") 1030 that fetches 16 bytes of aligned instruction bytes, on each clock cycle, from the L1 instruction cache 1006 and delivers the 16 bytes of aligned instruction bytes to the instruction length decoder ("ILD") 1032. The IFU may fetch instructions corresponding to a particular branch of code following a branch instruction before the branch instruction is actually executed and, therefore, before it is known with certainty that the particular branch of code will be selected for execution by the branch instruction. Selection of code branches from which to select instructions prior to execution of a controlling branch instruction is made by a branch prediction unit 1034. The ILD 1032 processes the 16 bytes of aligned instruction bytes provided by the instruction fetch unit 1030 on each clock cycle in order to determine lengths of the instructions included in the 16 bytes of instructions and may undertake partial decoding of the individual instructions, providing up to six partially processed instructions per clock cycle to the instruction queue ("IQ") 1036. The instruction decoding unit ("IDU") reads instructions from the IQ and decodes the instructions into microinstructions which the IDU writes to the IDQ 1024. For certain complex instructions, the IDU fetches multiple corresponding microinstructions from the MS ROM 1038.

The back-end out-of-order-execution engine 1022 includes a register alias table and allocator 1040 that allocates execution-engine resources to microinstructions and uses register renaming to allow instructions that use a common register to be executed in parallel. The register alias table and allocator component 1040 then places the microinstructions, following register renaming and resource allocation, into the unified reservation station ("URS") 1042 for dispatching to the initial execution functional units 1044-1046 and 1048-1050 of six parallel execution pipelines. Microinstructions remain in the URS until all source operands have been obtained for the microinstructions. The parallel execution pipelines include three pipelines for execution of logic and arithmetic instructions, with initial functional units 1044-1046, a pipeline for loading operands from memory, with initial functional unit 1048, and two pipelines, with initial functional units 1049-1050, for storing addresses and data to memory. A memory-order buffer ("MOB") 1050 facilitates speculative and out-of-order loads and stores and ensures that writes to memory take place in an order corresponding to the original instruction order of a program. A reorder buffer ("ROB") 1052 tracks all microinstructions that are currently being executed in the chains of functional units and, when the microinstructions corresponding to a program instruction have been successfully executed, notifies the retirement register file 1054 to commit the instruction execution to the architectural state of the process by ensuring that ISA registers are appropriate updated and writes to memory are committed.

A processor core is, of course, an exceedingly complex device, containing a forest of signal paths and millions of individual transistors and other circuit components. The myriad components and operational details are far beyond the scope of the current discussion. Instead, the current discussion is intended to provide a context for the performance-imbalance-monitoring registers included within a processor in order to facilitate performance monitoring with respect to hardware threads.

Figure 11:
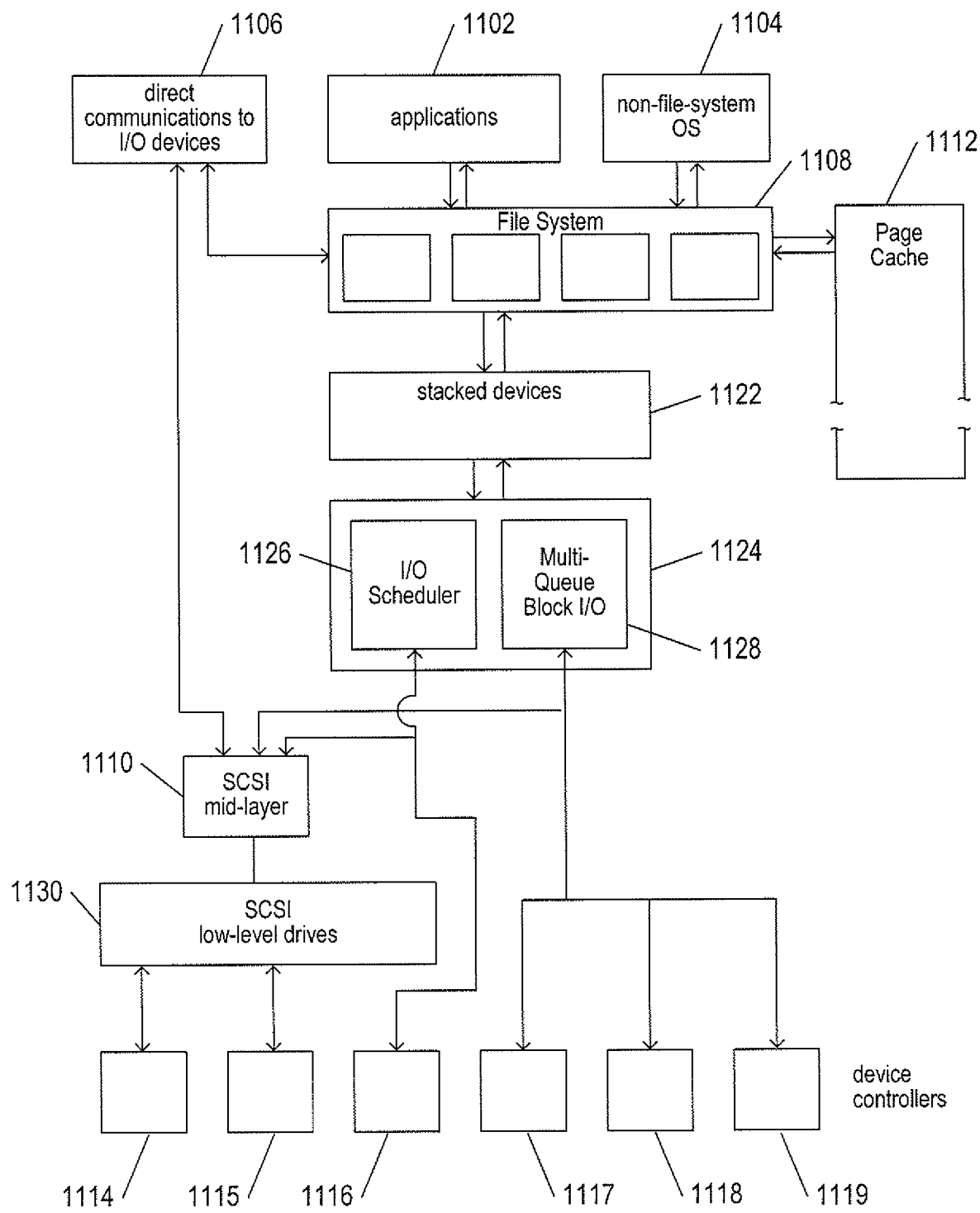
FIG. 11 illustrates the storage stack within a computer system.

FIG. 11 illustrates the storage stack within a computer system. The storage stack is a hierarchically layered set of components that interconnect application programs, portions of an operating system, and remote computational entities with the controllers that control access to, and operation of, various types of data-storage devices. In FIG. 11, executing application programs are represented by rectangle 1102, the non-file-system portion of an operating system is represented by rectangle 1104, and remote computational entities accessing data-storage facilities of the local computer system through communications devices are represented by rectangle 1106. The applications and non-file-system portions of the operating system 1102 and 1104 access local data-storage devices through the file system 1108 of the operating system. Remote processing entities 1106 may access data-storage devices through the file system or may directly access a small-computer-system-interface ("SCSI") middle layer 1110. The file system maintains a page cache 1112 for caching data retrieved from storage devices on behalf of applications, non-file-system OS components, and remote computational entities. The file system, in turn, accesses the low-level data-storage device controllers 1114-1119 through a stacked-devices layer 1122 and block layer 1124. The stacked-devices layer 1122 implements various types of multi-device aggregations, such as redundant array of independent disks ("RAID") that provide for fault-tolerant data storage. The block layer 1124 stores data blocks in, and retrieves data blocks from, data-storage devices. Traditional devices with single input and output queues are accessed via an I/O scheduler 1126 while more modern, high-throughput devices that provide for large numbers of input and output queues from which device controllers fetch I/O requests, in parallel, for parallel execution of the I/O requests by high-throughput devices are accessed through a multi-queue block I/O component 1128. The SCSI midlayer 1110 and lower-level SCSI drives 1130 provide access to the device controllers for data-storage devices with SCSI interfaces 1114-1115. Other types of I/O device controllers 1116 that do not provide the SCSI interface are directly accessed by the I/O scheduler component 1126. The device controllers for modem, multi-queue, high-throughput data-storage devices 1117-1119 are accessed directly by the multi-queue block I/O component 1128.

Figure 12:
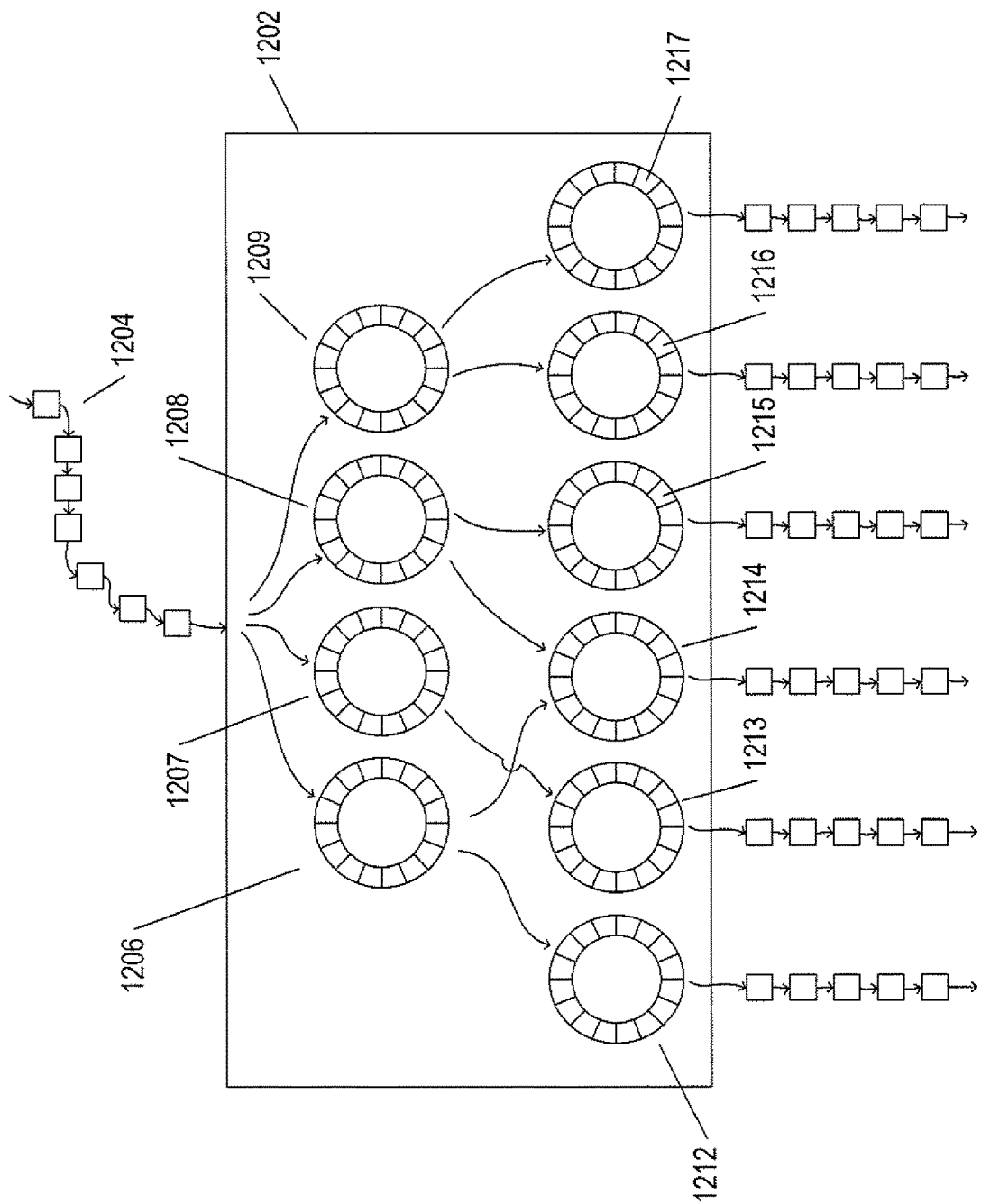
FIG. 12 illustrates the general functionality of the block layer of the storage stack (1124 in FIG. 11).

FIG. 12 illustrates the general functionality of the block layer of the storage stack (1124 in FIG. 11). The block layer 1202 receives a stream of I/O requests 1204 from the file system (1108 in FIG. 11). The block layer 1202 internally queues the incoming requests to internal input queues 1206-1209. Then, the block layer carries out various types of rearrangements and reorganizations of the queued I/O requests and outputs the I/O requests to output queues 1212-1217, from which the I/O requests are dequeued by various low-level storage-device controllers. The traditional I/O scheduler generally reorders incoming I/O requests for a particular device in order to minimize access latencies due to order-dependant I/O-request-execution characteristics of the device. Traditional magnetic storage devices, for example, employ heads disposed along an actuator arm that moves radially with respect to disk-shaped magnetic platters in order to access circular tracks of data. Actuator arm movement is a much higher-latency operation than waiting for a particular appropriate block within a circular track to spin beneath the disk head. Therefore, I/O requests are rescheduled, using techniques similar to the techniques used to schedule elevator travel within high-rise buildings, in order to minimize the amount of head movement involved in accessing a number of recently input I/O requests. The multi-queue block I/O component (1128 in FIG. 11), by contrast, may be concerned with distributing input I/O requests among multiple input queues associated with a particular high-throughput device.

Figure 13A:
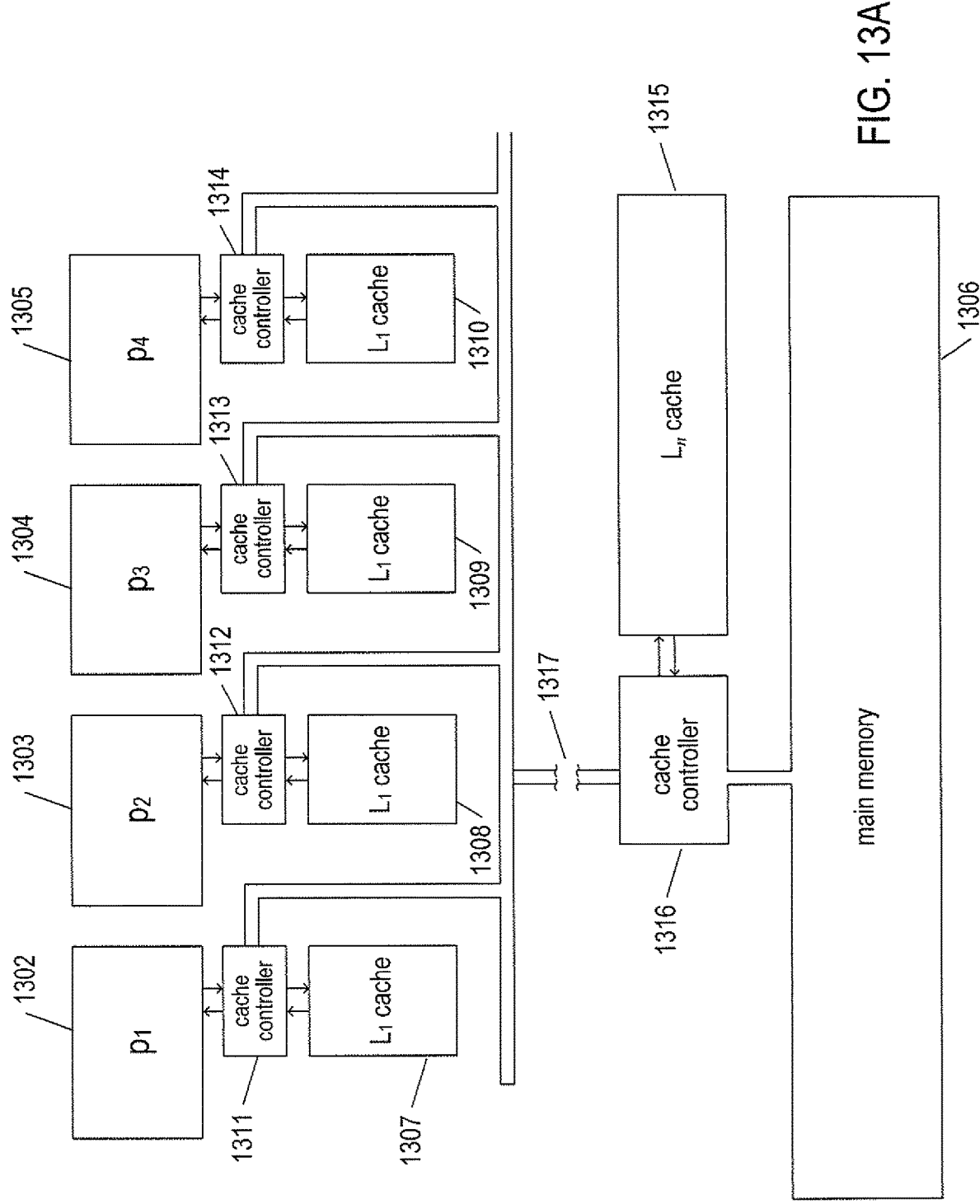
FIGS. 13A-P illustrate problems associated with shared memory in multi-processing-entity computational environments and the approaches used to ameliorate these problems in modern computing systems.
Figure 13B:
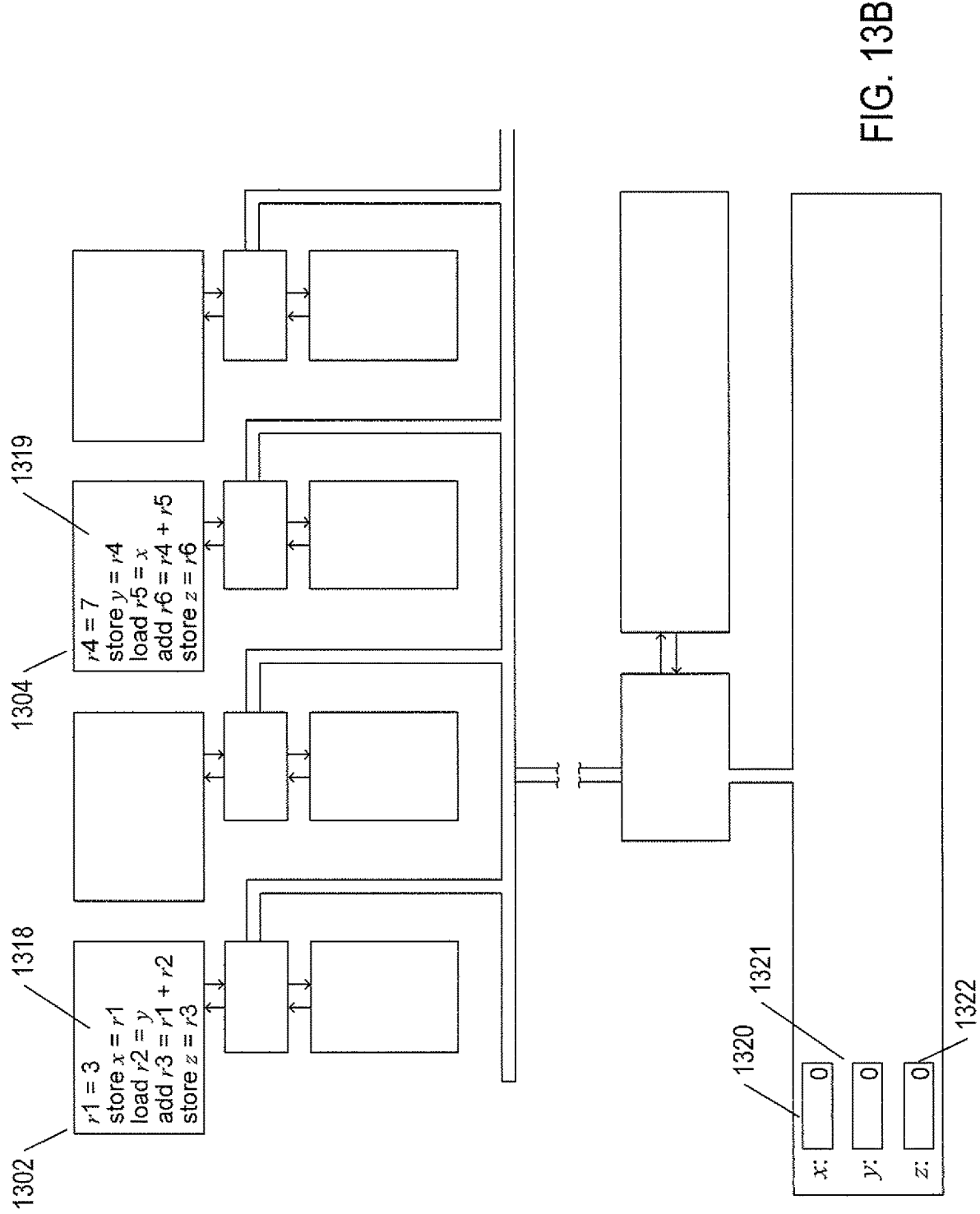
FIGS. 13Q-R illustrate an atomic fetch-and-instruction.
Figure 13C:
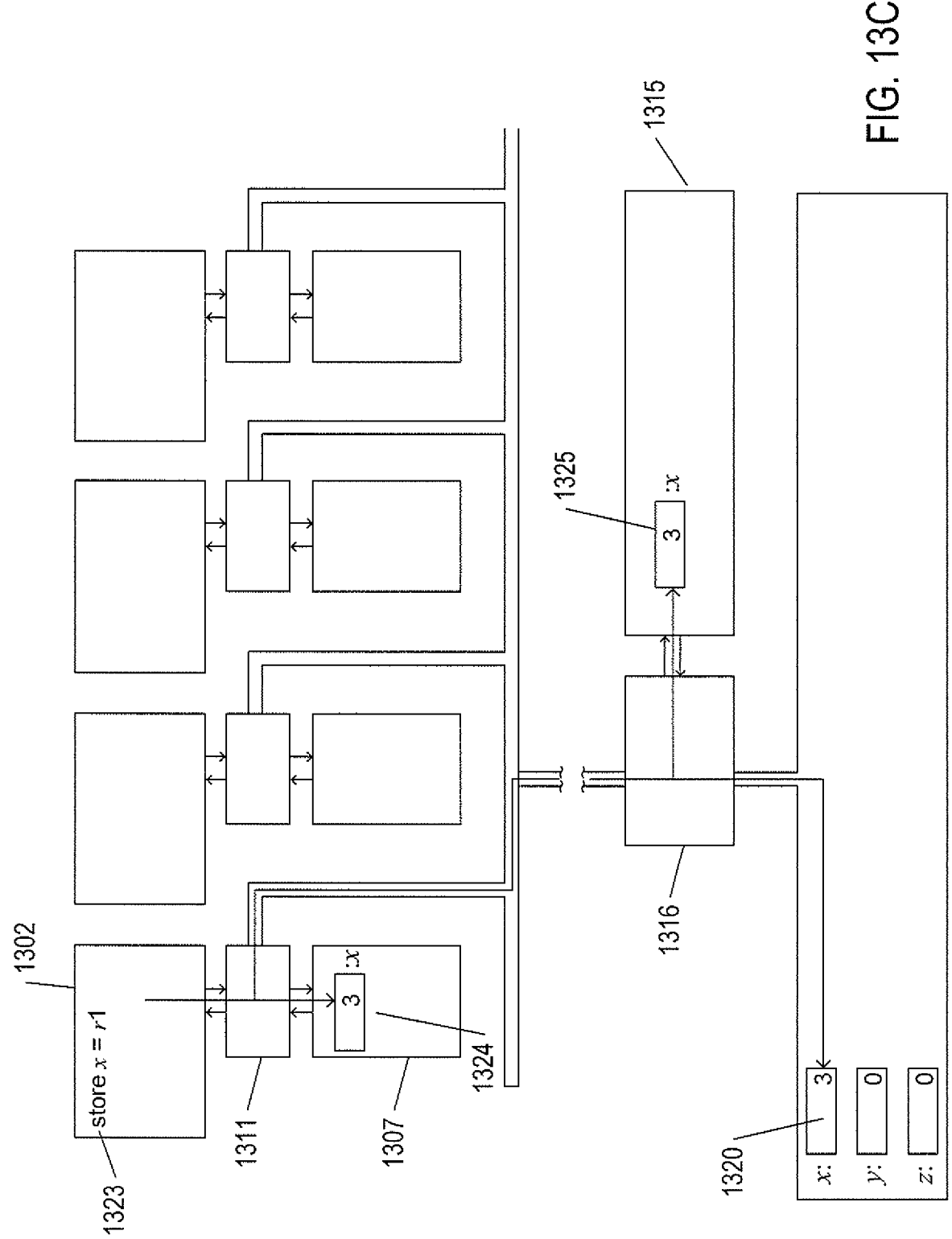
Figure 13D:
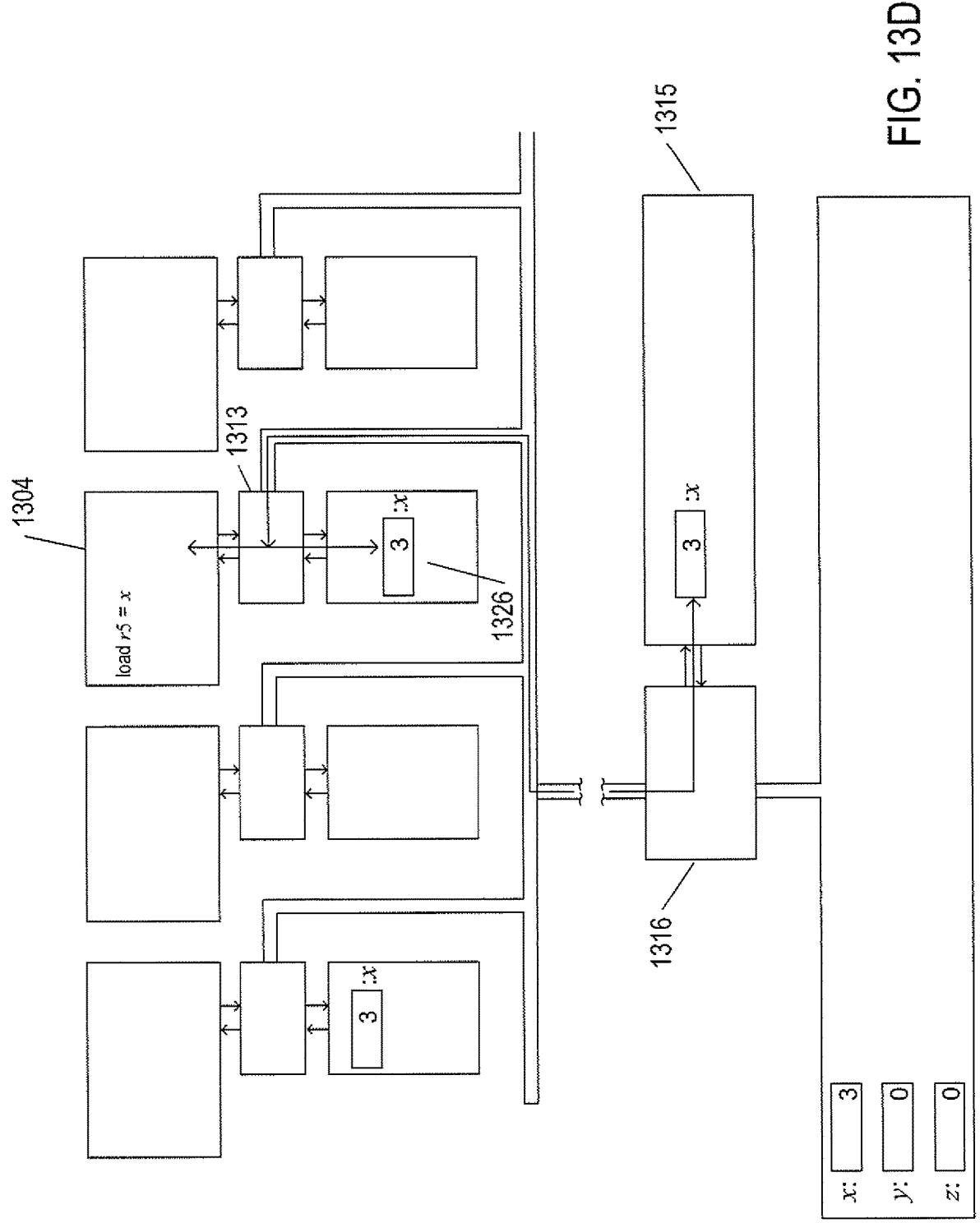
Figure 13F:
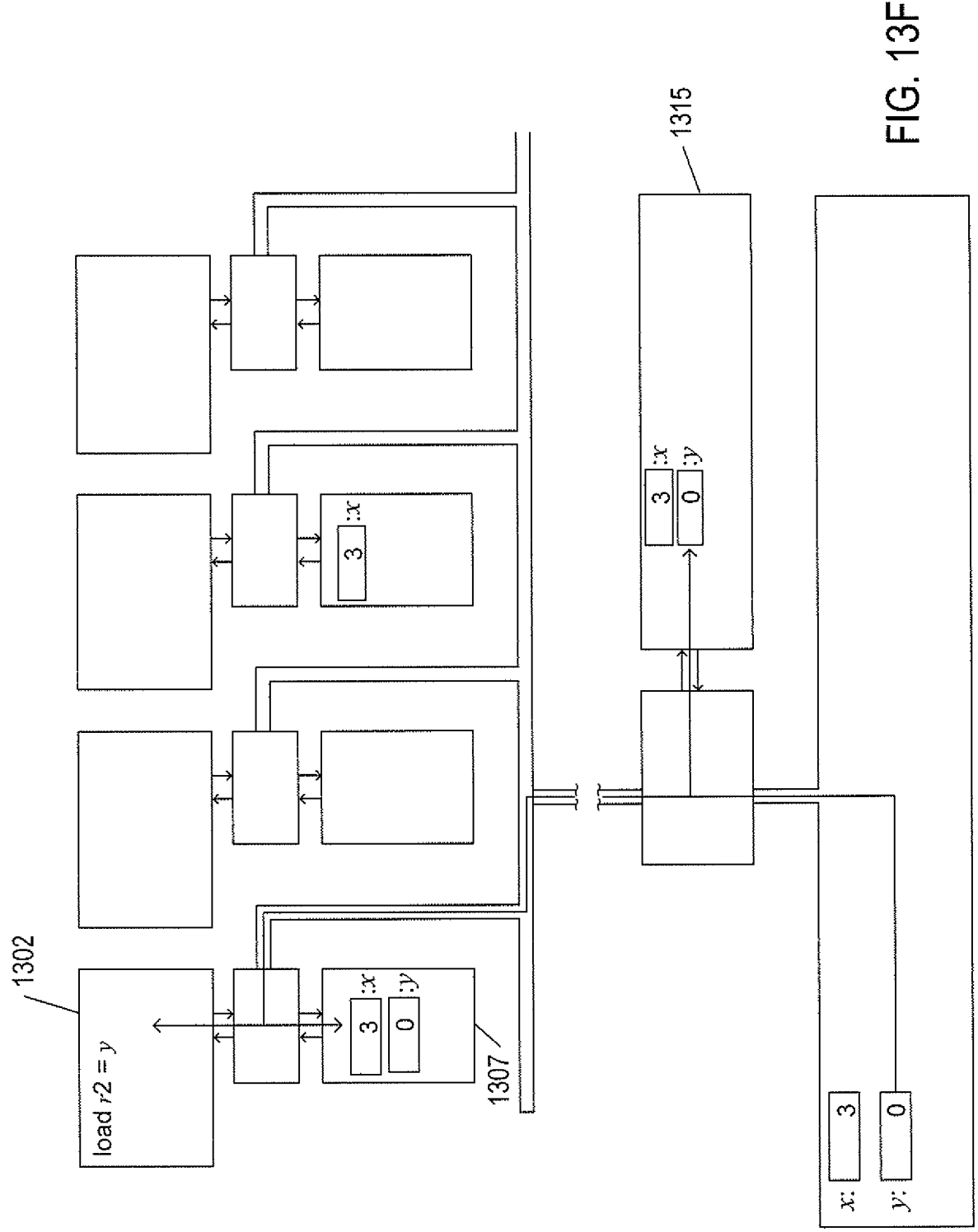
Figure 13G:
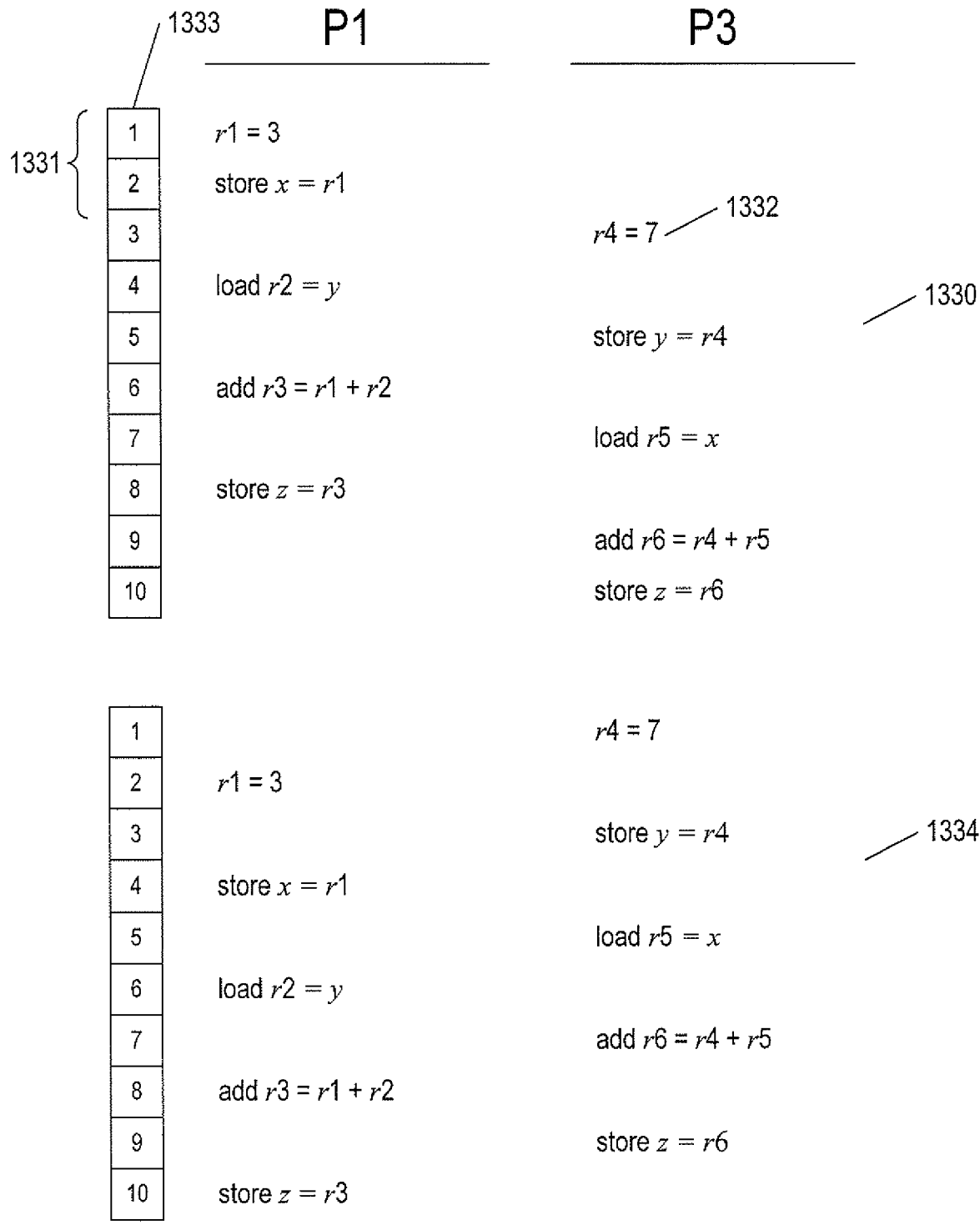
Figure 13H:
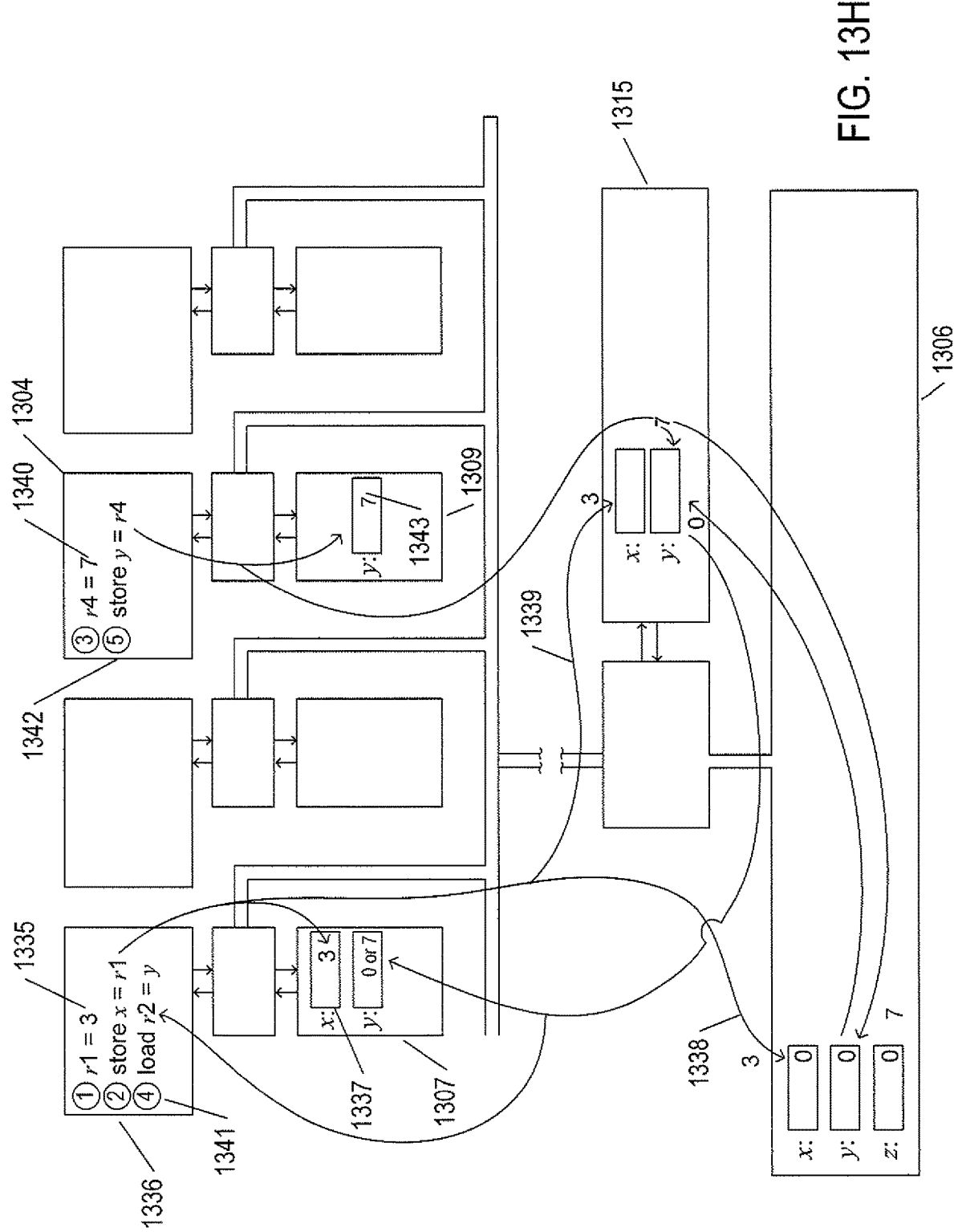
Figure 13I:
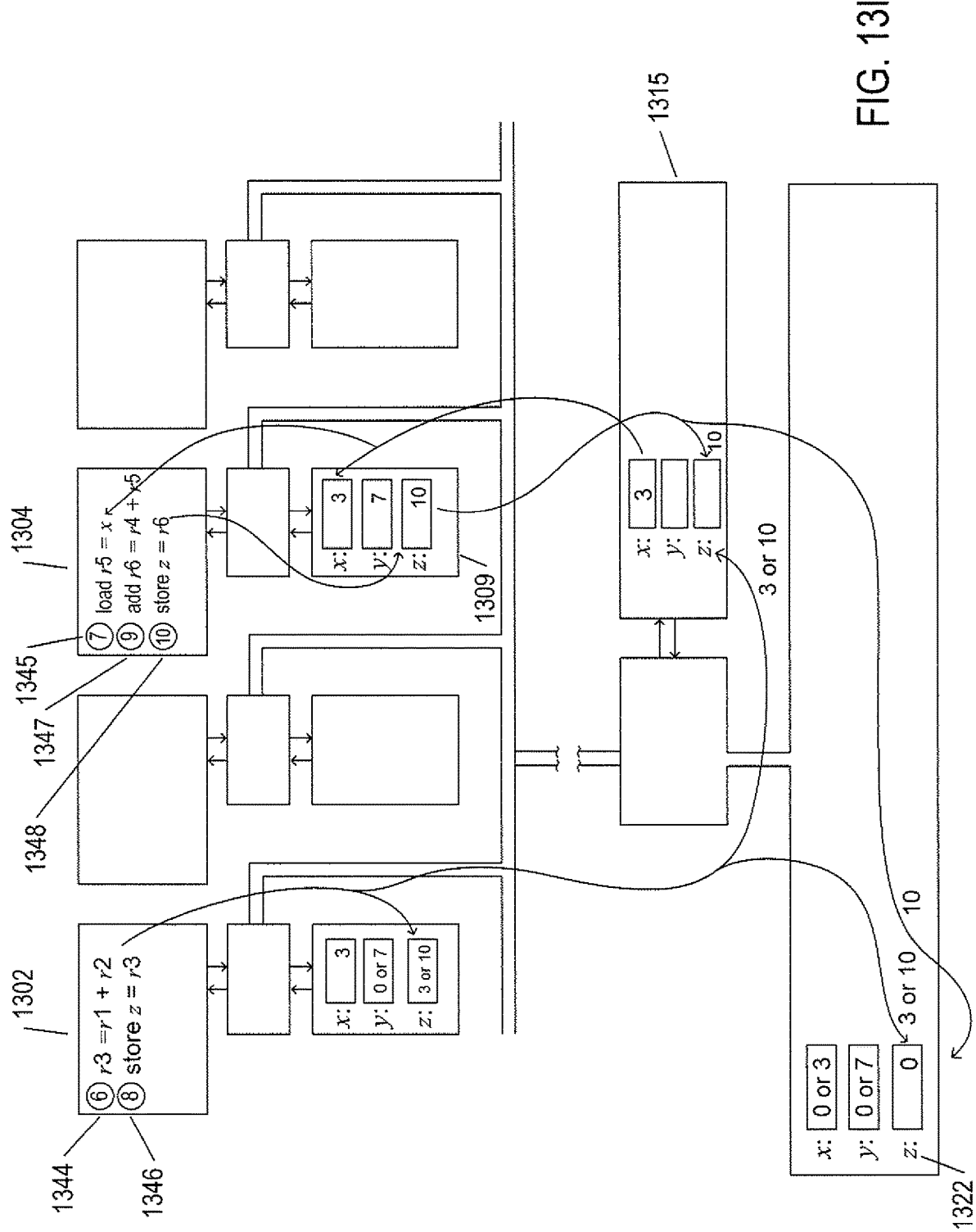
Figure 13J:
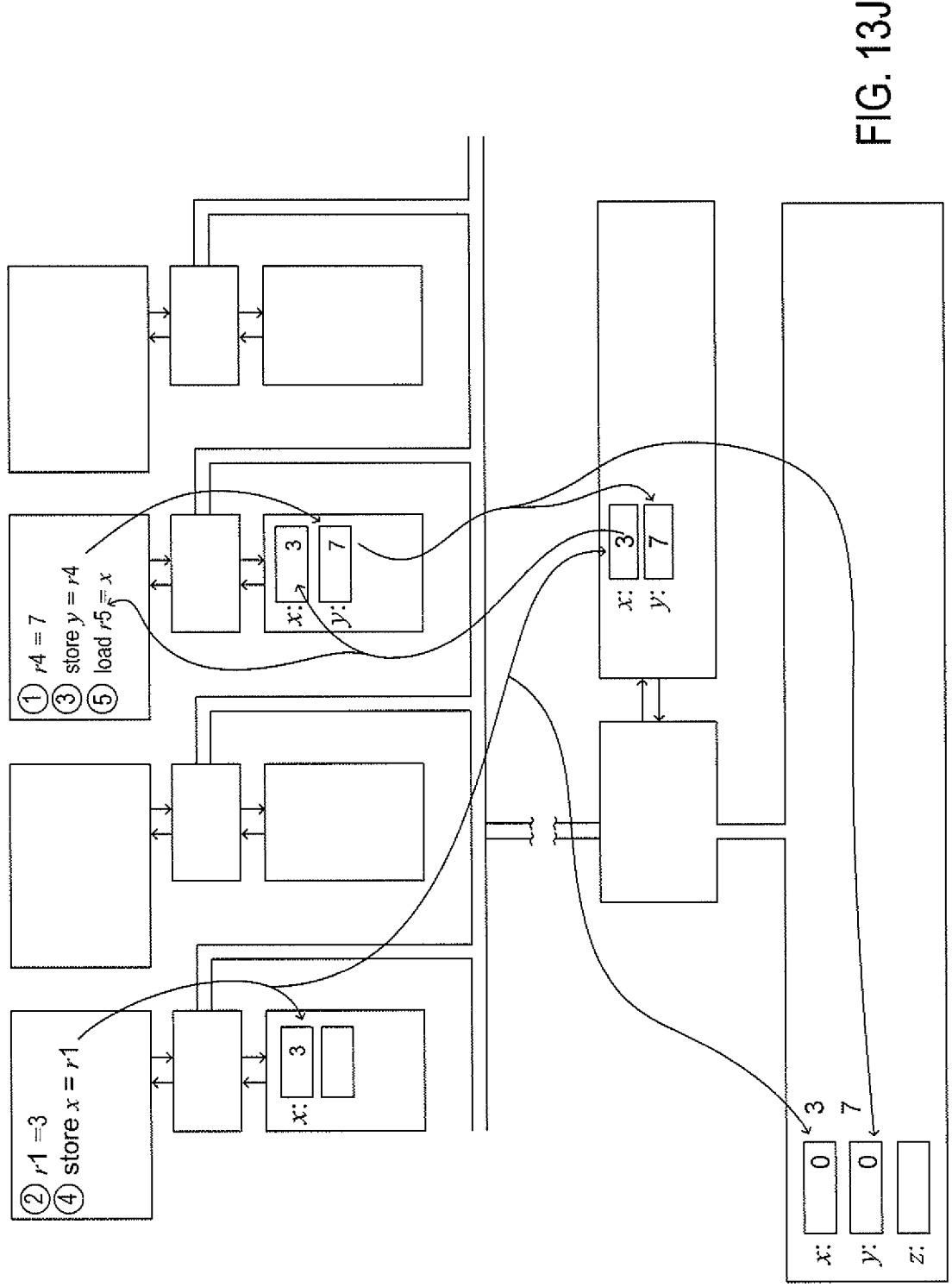
Figure 13M:
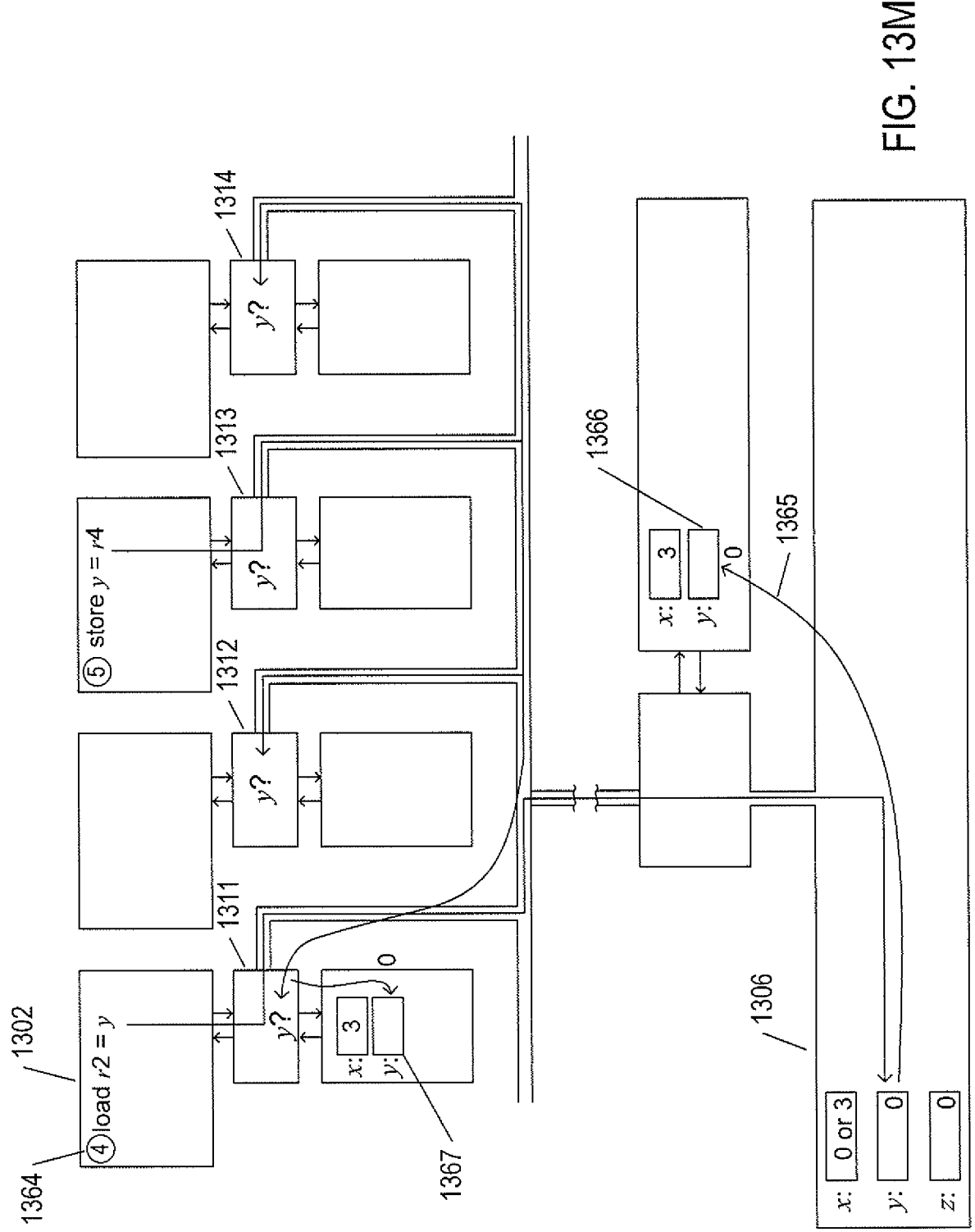
Figure 13N:
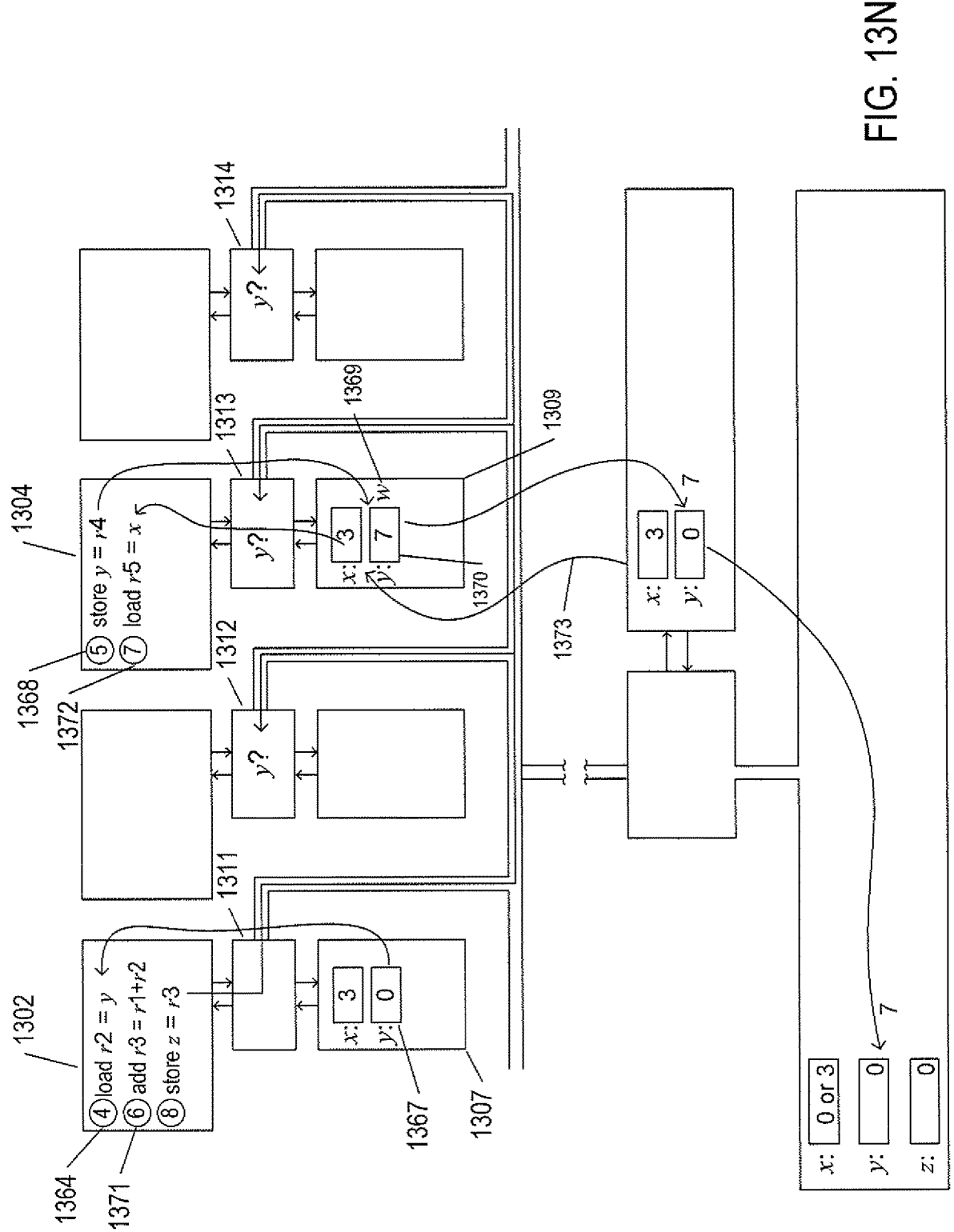
Figure 13O:
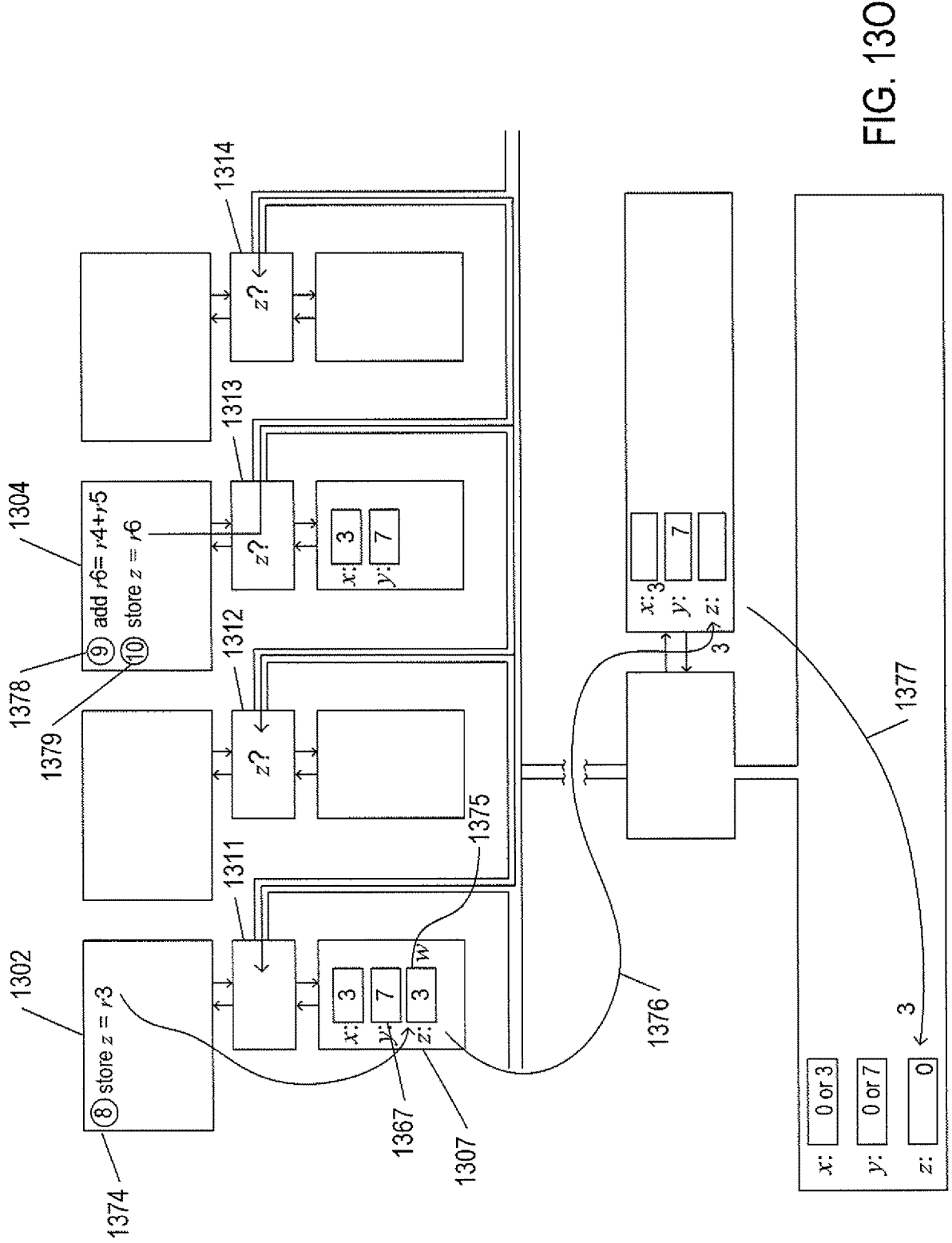
Figure 13P:
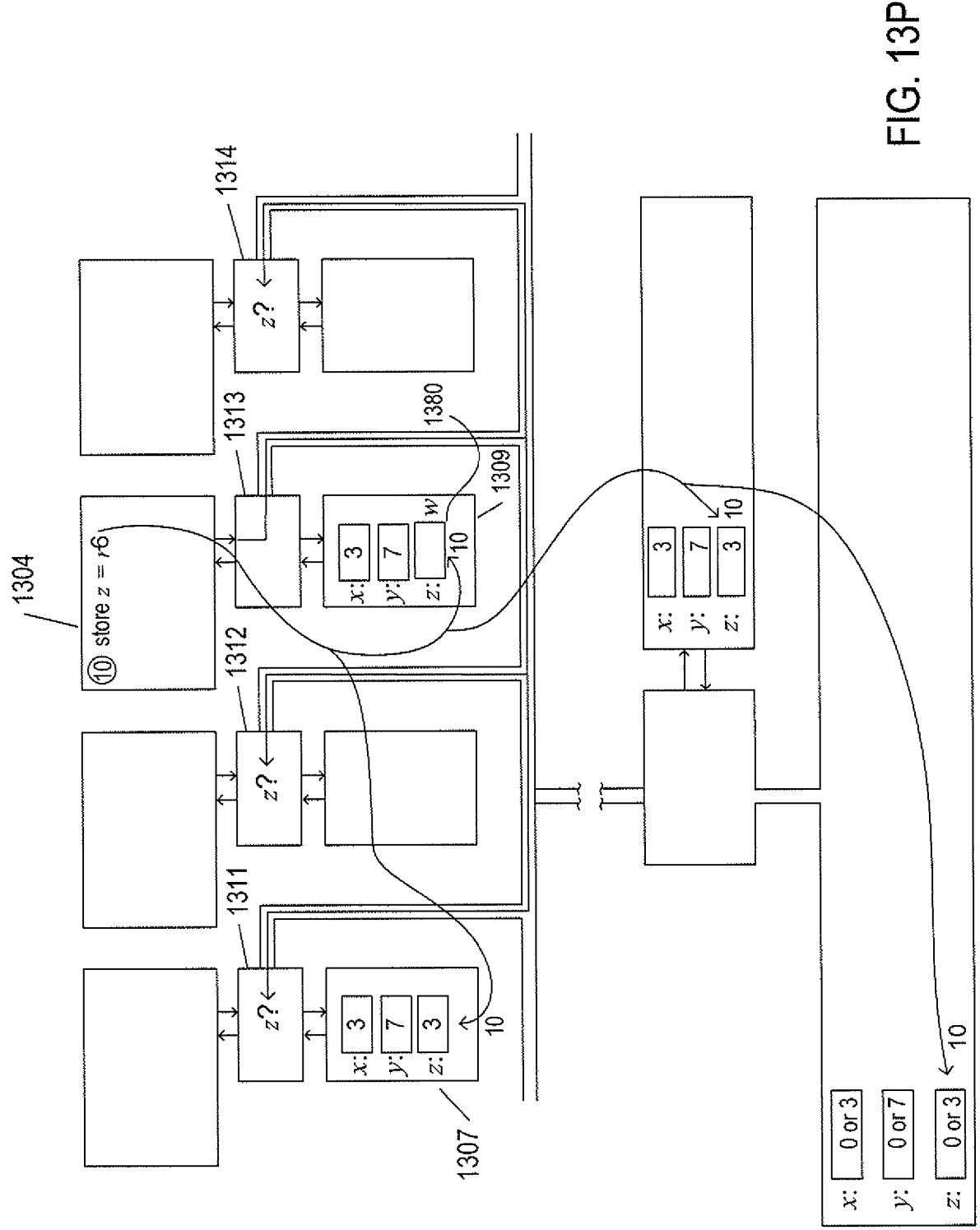

Problems Associated With Shared Memory in Multi-Processing-Entity Computational Environments FIGS. 13A-P illustrate problems associated with shared memory in multi-processing-entity computational environments and the approaches used to ameliorate these problems in modern computing systems. Although the context of the discussion of FIGS. 13A-P is hierarchical memory caches, the problem of controlling access by independently executing processes and threads to shared resources is quite general in electronics and computing, and methods used to address the problem with respect to cache-controller contention are also employed at the level of virtualization layers, operating systems, device controllers, and the hardware layer.

FIG. 13A shows a generalized multi-processing-entity computational environment that includes four processing entities 1302-1305 that access a main memory 1306 through a hierarchical system of memory caches that include a first layer of memory caches 1307-1310, referred to as "local caches," each accessed through an associated cache controller 1311-1314, respectively, and a highest-level memory cache 1315 accessed through a cache controller 1316. Each local cache is accessed only by the processing entity associated with the local cache. The broken communications pathway 1317 indicates that there may be additional levels of caches in the system. This is an example multi-processing-entity computational environment used to describe problems and associated solutions, below. Actual multi-processing-entity computational environments may include fewer or a greater number of processing entities, including cores within a multi-core processor, processors within a multi-processor system, or both.

FIG. 13B illustrates two sets of five instructions, 1318 and 1319, to be executed by the first 1302 and third 1304 processing entities in the multi-processing-entity computational environment discussed above with reference to FIG. 13A. The two sets of instructions access three memory locations 1320-1322 that are labeled with the abstract memory-location addresses x, y, and z, respectively. Initially, all three memory locations store the numeric value 0.

Execution of the two sets of five instructions 1318 and 1319 occurs in parallel. The actual order in which the instructions are executed is generally not deterministic, but may depend on a variety of different computational-environment factors. Certain of the instructions are register instructions that do not involve access to main memory. These instructions include instructions of the type "r1=3," which stores the numeric value 3 into internal processing-entity register r1. Another register operation is the instruction "add r3=r1+r2," which adds the contents of registers r1 and r2 together and places that result in register r3. These type of instructions execute quickly within internal processing entities and are not associated with significant latencies. By contrast, the instruction "store x=r1" stores the contents of internal-processing-entity register r1 into memory location x and the instruction "load r2=y" fetches the value stored in memory location y and places it into register r2. Storing/load instructions involve cache controllers and communications-subsystem transactions and therefore involve significant latencies.

FIGS. 13C-F illustrate store and load instructions, independent of parallel-execution concerns. In FIG. 13C, the first processing entity 1302 executes a store instruction 1323. Because the local cache 1307 for processing entity 1302 does not already contain an entry for memory location x, when processing entity 1302 issues a storage request to the local-cache controller 1311, the local cache controller allocates space within the local cache and stores the value 3 in that space 1324. In addition, the local cache controller 1311 transmits a request to higher-level caches, including to highest-level cache controller 1316, which stores the value 3 in a entry for memory location x 1325 within the highest-level cache 1315 and issues a request to main memory to store the value 3 in the main-memory location x 1320. Thus, a store instruction may propagate through the cache hierarchy to main memory. In certain systems, the storage request results in only the local cache being updated, with additional updates deferred until the stored value is flushed from the local cache for one of various reasons. In other systems, the value written to local cache is immediately propagated through the cache hierarchy. Propagation through the cache hierarchy and to main memory, however, involves significant latencies.

FIG. 13D shows execution of the instruction "load r5=x" by the third processing entity 1304. The processing entity issues a fetch request to its local cache controller 1313, but the local cache does not yet contain the value for memory location x. Note that it is assumed that the local cache initially has the state shown in FIG. 13C. As a result, the local cache controller issues the fetch operation to higher-level caches. The highest-level cache 1315 contains the value 3 for memory location x, previously placed there by the store instruction executed by processing entity 1302, discussed above with reference to FIG. 13C. As a result, the highest-level cache controller 1316 returns the value 3 to the local cache controller 1313, which then writes that value to the local cache 1326 as well as returns the value 3 to processing entity 1304 for storage in register r5. Of course, were there additional cache levels, the value for memory location x would likely have been obtained from a lower-level cache. Thus, the fetch operation needs to only traverse the cache hierarchy to the point that a first stored value for memory location x is found. There is no need for this fetch to propagate to main memory when one of the caches already contains the value. By contrast, in FIG. 13E, the first processing entity 1302 executes an instruction 1327 to load the memory value y into register r2. Because neither the local cache 1307 nor the highest-level cache 1315 contains a stored value for memory location y, the fetch request propagates all the way to main memory 1306, as indicated by arrow 1328. Then, as shown in FIG. 13F, the high-level cache 1315 and the local cache 1307 are updated to contain the value 0 for memory location y as the value fetched from main memory propagates back through the cache hierarchy to the processing entity 1302. Although the local caches 1307-1310 are accessed only by their associated processing entities, multiple processing entities generally share higher-level caches. In the example multi-processing-entity environment of FIGS. 13A-R, all four processing entities 1302-1305 share the highest-level cache 1315.

The intent of caching is that the processing entities should most often need only to access their local caches, with only occasionally access to higher-level caches and main memory. This is because routines executed by processing entities often make repeated accesses to only a relatively small number of memory locations. The first access to a memory location involves accessing higher-level caches and possibly main memory, but subsequent accesses can be satisfied from locally stored values for the memory location. In many caching systems, for example, when the value is written to memory, the value may remain in a local cache or higher-level cache until some type of cache-flush operation forces the value to main memory. In these systems, the data-storage state of main memory is actually an aggregation of the states of main memory and all of the caches. Cache flushes of local caches push values to higher-level caches and flushes of the higher-level caches eventually push values to main memory. The access time for a memory location increases as the number of levels of caches need to be accessed, with the very longest access times associated with accesses that propagate all the way to main memory.

In a multi-processing-entity environment, the two sets of instructions 1318 and 1319 (see FIG. 13B) may be executed in a variety of different orders that represent various types of interleavings between the sequential order of the two instruction sets. This is because, in general, instruction execution is not synchronized between processing entities and because the latencies of instruction execution may vary tremendously on the current local and global states of the multi-processing-entity computational environment. As one example, a load instruction may execute quickly when the local cache contains the desired value but may execute quite slowly when the value needs to be retrieved from main memory. FIG. 13G shows two different possible orders of execution of the two sets of instructions 1318-1319 by processing entities 1302 and 1304. There are 10 instructions in total. In a first execution order 1330, processing entity 1302, referred to as "P1," executes its first two instructions 1331 before processing entity 1304, referred to as processing entity "P3," executes its first instruction 1332. Thus, the order of execution of the instructions is obtained from the vertical array 1333. A second possible order of instruction execution is shown in a second portion 1334 of FIG. 13G.

Next, in FIGS. 13H-K, illustration of the execution of the 10 instructions of instructions sets 1318 and 1319 are illustrated. These illustrations show execution of the 10 instructions without benefit of cache-controller communications and cache-controller contention control, to illustrate why cache-controller contention control and cache-controller communications are needed. The problems that arise, in these examples, are similar to problems that arise in many different computational contexts at many different levels and layers of a computer system.

FIG. 13H illustrates execution of the first five instructions of the ten instructions of instruction sets 1318 and 1319 according to the first overall order 1330 shown in FIG. 13G. The register instruction 1335 executes first, followed by the first store instruction 1336. The store instruction results in writing of the value 3 to a local copy of memory location x 1337 in the local cache 1307 and delayed or deferred propagation of that write to the highest-level cache 1315 and main memory 1306, as indicated by curved arrows 1338 and 1339. The register instruction 1340 next executes, followed by the load instruction 1341. The load instruction propagates all the way to main memory 1306 and returns the value 0 to highest-level cache 1315 and local cache 1307. However, as the load instruction 1341 is executing, the store instruction 1342 executes on the processing entity 1304. This store instruction writes the value 7 to memory-location-copy 1343 in local cache 1309 and begins to propagate further down to the lower cache levels. Because, in the current discussion, there is no provision for synchronizing the load and store operations between processing entities, it is now uncertain whether the value associated with memory location y in the highest-level cache 1315 is 0 or 7 and it is therefore also uncertain whether the value associated with the memory location y in local cache 1307 is 0 or 7. The value of memory location y in local cache 1307 depends on whether the 0 fetched from main memory by the load instruction 1341 makes it to the various caches prior to or after the value 7, written by store instruction 1342, propagates to the highest-level cache in main memory.

FIG. 13I illustrates execution of the final five of ten instructions of the instruction sets 1318 and 1319. The sixth instruction that is executed 1344 is a register instruction that adds the contents of registers r1 and r2. Because there was a race condition with respect to loading the value of memory location y by the first processing entity 1302 and storing a value into memory location y by processing entity 1304, as discussed above with reference to FIG. 13H, it is uncertain whether the value contained in register r2 in processor 1302 is 0 or 7. Thus, the computed sum stored in register r3 may be either 3 or 10, depending on the actual order in which caches were updated. Next, processing entity 1304 carries out load instruction 1345. This results in the value 3 being accessed from the highest-level cache 1315 and written to local cache 1309 before propagating to processing entity 1304. Next, the first processing entity 1302 executes store instruction 1346, which directs either the value 3 or 10, depending on the value contained in register r3, to be stored in memory location z. Finally, the last two instructions 1347 and 1348 are executed by processing entity 1304, resulting in processing entity 1304 attempting to store the value 10 into memory location z by executing the final instruction 1348. Again, there is a race condition between the store operations executed in instructions 1346 and 1348 by processing entities 1302 and 1304, respectively. Thus, memory location z in main memory 1322 may be set either to the value 3 or to the value 10, depending on the actual order of cache updates and other operations carried out as the instructions of instruction sets 1318-1319 are executed by processing entities 1302 and 1304.

From this example, it is clear that the presence of the multi-level cache hierarchy as well as independently executing processing entities results in nondeterministic changes to the state of both the caches and main memory. In this small example, when the ten instructions are executed according to the overall execution sequence 1330 in FIG. 13G, the value stored in memory location z may end up either being 3 or 10. In fact, the example assumed certain orderings of intermediate cache operations in this example. There may, in fact, be additional possible outcomes, depending on the overall sequence in which the various cache operations complete.

FIGS. 13J-K illustrate, in the same fashion as FIGS. 13H-I, execution of the ten instructions of instruction sets 1318-1319 in the overall execution order 1334 shown in FIG. 13G. In this case, as shown by arrows 1350 and 1351 in FIG. 13K, memory location z ultimately receives the value 10. Thus, in the second possible execution order of the ten instructions, the value stored in memory location z will ultimately be 10, rather than having an uncertain value as a result of execution in the first possible execution order, as discussed above with reference to FIGS. 13H-I for the instruction-execution sequence 1330 in FIG. 13G.

Clearly, the types of nondeterministic behavior illustrated in this simple example would not be acceptable for a multi-processing-entity computational system. Each time an identical set of routines and programs were executed in parallel by multiple processing entities, a very different outcome could be anticipated. However, to be useful, a computer system needs to be both deterministic as well as correct, regardless of the overall order of instruction execution within multiple processing entities.

FIGS. 13L-R illustrate general approaches to ameliorating the nondeterministic behavior of parallel-processing systems with hierarchical cache memories discussed above with reference to FIGS. 13A-K. FIGS. 13L-R illustrate execution of the ten instructions of the two five-instruction instruction sets 1318 and 1319 discussed with reference to FIGS. 13A-K, but additionally show the various types of contention-control mechanisms that are employed in order to ensure deterministic operation of the parallel computing system. As shown in FIG. 13L, the first processing entity executes the first register operation 1354 and the second store instruction 1356. When the store instruction is executed, the local-cache controller 1311 for the local cache 1307 communicates with the remaining cache controllers 1312-1314 to determine whether or not their respective caches contain a value for memory location x. In alternative systems, local cache controller 1311 may send a query to a cache directory, which keeps track, in a centralized location, of the states of the local memory caches. In addition, the local cache controller 1311 requests exclusive access to memory location x. In the current case, because the remaining local caches 1312-1314 do not contain values from memory location x, either they mutually agree, or a cache director decides, to grant exclusive or write access to memory location x, indicated in FIG. 1311 by the small w 1358 that labels the local copy 1360 of memory location x and local cache 1307. In the case that another cache contained a value for memory location x, that value would be returned by one of the other cache controllers to local cache 1311. Local cache controller 1311 also directs the value 3 for memory location x, as indicated by arrow 1361, to the highest-level cache 1315, with the value ultimately potentially directed, as indicated by arrow 1362, to main memory 1306. In many systems, the value 3 would be directed, with significant latency, to main memory. In other systems, values tend to remain in the lowest-level caches until they are flushed, in order to make room for other values, in which case they percolate upward to higher-level caches and, ultimately, main memory. Various types of system and processor events may result in cache flushes, in which all or a significant portion of the values in a cache are flushed upward to higher-level caches and, ultimately, main memory. There are a variety of different general methods and techniques for cache control. As also shown in FIG. 13L, the second processing entity 1304 carries out register instruction 1363.

As shown in FIG. 13M, once the second store instruction (1356 in FIG. 13L) has finished execution, write access is relinquished by the local cache controller 1311. This also involves communication with other cache controllers or with the centralized directory. Then, the fourth load instruction 1364 is issued by the first processing entity 1302. First, local cache controller 1311 inquires whether any of the remaining cache controllers 1312-1314 currently maintain a value for memory location y in their respective caches. Because none of the cache controllers contain a value for memory location y, cache controller 1311 issues a request to the higher-level caches that is ultimately propagated to main memory 1306. The value 0 is returned, as indicated by arrow 1365, to the highest-level cache, where a copy of the value is stored 1366 and ultimately returns to local cache controller 1311, which also stores a value for memory location y 1367.

As shown in FIG. 13N, once the value 0 has been stored by the local cache controller 1311 into a copy of the current value of memory location y 1367 in local cache 1307, the value is returned to processing entity 1302 to allow for completion of the load instruction 1364. Next, the third processing entity 1304 executes the fifth store request 1368. In order to write a value to the memory location y, cache controller 1313 communicates either with the remaining cache controllers, as shown in FIG. 13N, or with a directory service to determine whether any of the other local caches contains a value for memory location y. In this case, cache controller 1311 responds affirmatively, sending the stored value 0 from memory location y back to cache controller 1313. In addition, either the remaining cache controllers or the directory service agrees to provide cache controller 1313 with exclusive access to memory location y, indicated by the "w" symbol 1369 next to a local copy 1370 of memory location y in cache 1309. Subsequently, as shown in FIG. 13O, the local copy 1367 of memory location y in cache 1307 is updated to contain the current value 7 written to memory location y by execution of store instruction 1368 of FIG. 13N. Returning to FIG. 13N, the first processing entity 1302 executes the register instruction 1371 and the third processing entity 1304 executes the seventh load instruction 1372 to load the value of memory location x into register r5. Because the local cache does not contain a value for memory location x, the cache controller obtains a value from a higher-level cache, as represented by arrow 1373. In other types of systems, the local cache controller might instead fetch the value from local cache controller 1311.

Next, as shown in FIG. 13O, the first processing entity 1302 executes the eighth store instruction 1374. In a first step, local cache controller 1311 queries the remaining cache controllers 1312-1314 to see whether any of the other local caches contain a value for memory location z. Because they do not, and because all of the cache controllers mutually agree to grant exclusive access to memory location z to cache controller 1311, cache controller 1311 stores the value 3 into a local copy 1375 of memory location z in local cache 1307. The value 3 is additionally propagated, as indicated by arrows 1376 and 1377, to the higher-level caches and to main memory. Then, the third processing entity 1304 executes register operation 1378 followed by the tenth store instruction 1379. As shown in FIG. 13P, execution of the tenth store instruction 1379 again involves communication between local cache controller 1313 and the remaining cache controllers 1311-1312 and 1314. In this case, because a value for memory location z is stored in cache 1307, the communication involves surrendering exclusive access to that memory location by cache controller 1311, establishing exclusive access to memory location z on behalf of cache controller 1313, and directing the value 10, currently stored in register r6 in the third processing entity 1304 to be written to the value for memory location z and cache 1307, to a copy of memory location z 1380 in local cache 1309, and to higher-level caches and, ultimately, main memory. In the end, following completion of the last instruction, memory location z will eventually have the value 10.

There are many different strategies and types of contention control used within hierarchical-memory-cache-based multi-processing-entity systems. Some use centralized directories, others rely on messages passing between controllers, some employ write-through caching while other deploy deferred writes, and many other details may vary between different types of systems. In general, contention control seeks to impose deterministic outcomes, at least with respect to a given overall order of instruction execution within the multiple processing entities. Contention control involves the ability to gain exclusive access to memory locations, by processing entities, in order to carry out write operations without the danger of race conditions with respect to multiple writes to a given memory location. In general, whatever the mechanism, a consistent view of memory is sought to be maintained within the low-level caches. Contention control does involve locking and serialization. When a local cache controller has exclusive access to a particular memory location, access to that memory location becomes serialized, as a result of which forward progress of other processing entities that need to access the memory location may be blocked. A consistent view of memory may necessarily involve a significant decrease in the amount of parallel execution within the system and a corresponding decrease in overall computational bandwidth.

Figure 13Q:
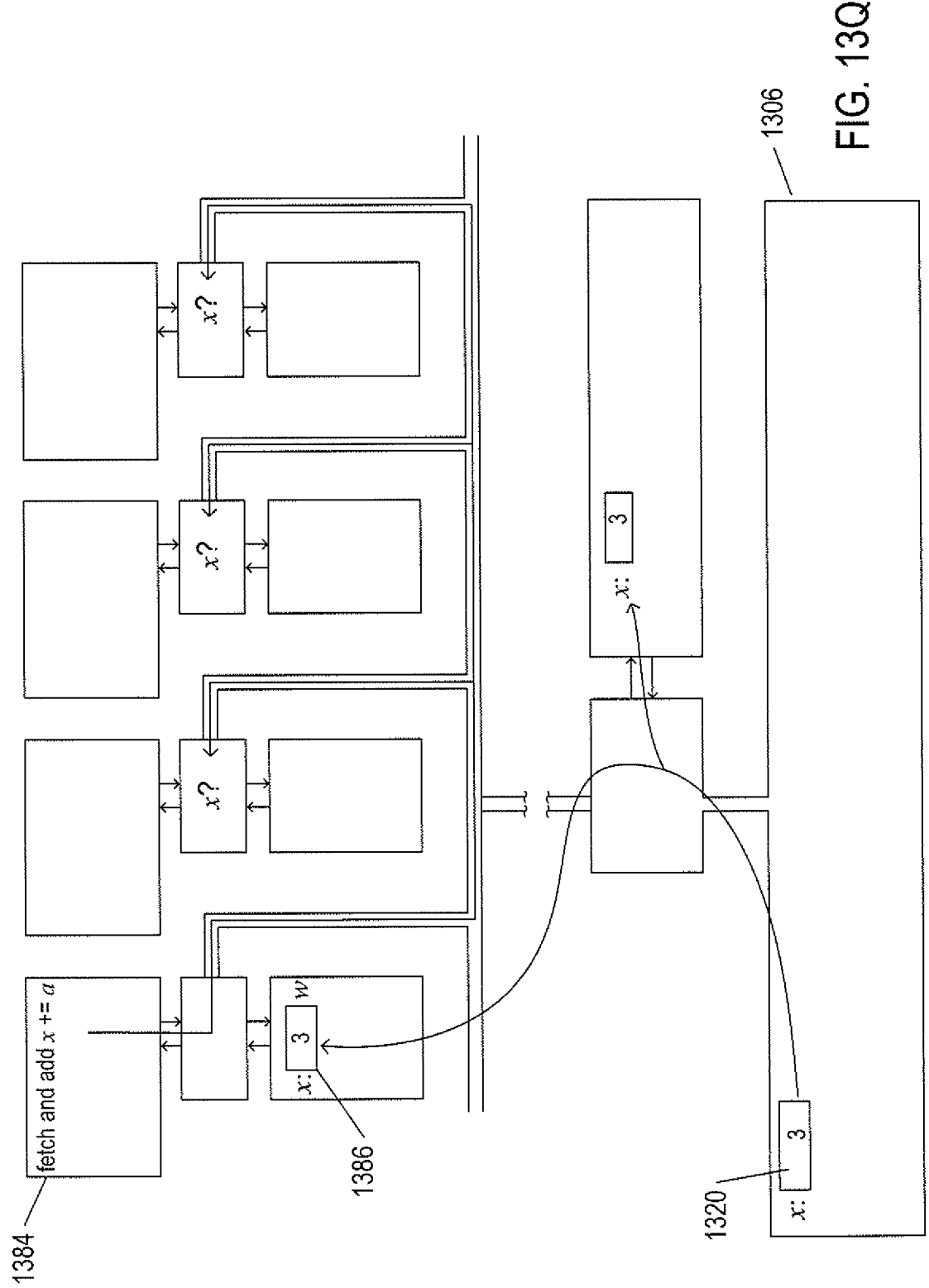
Figure 13R:
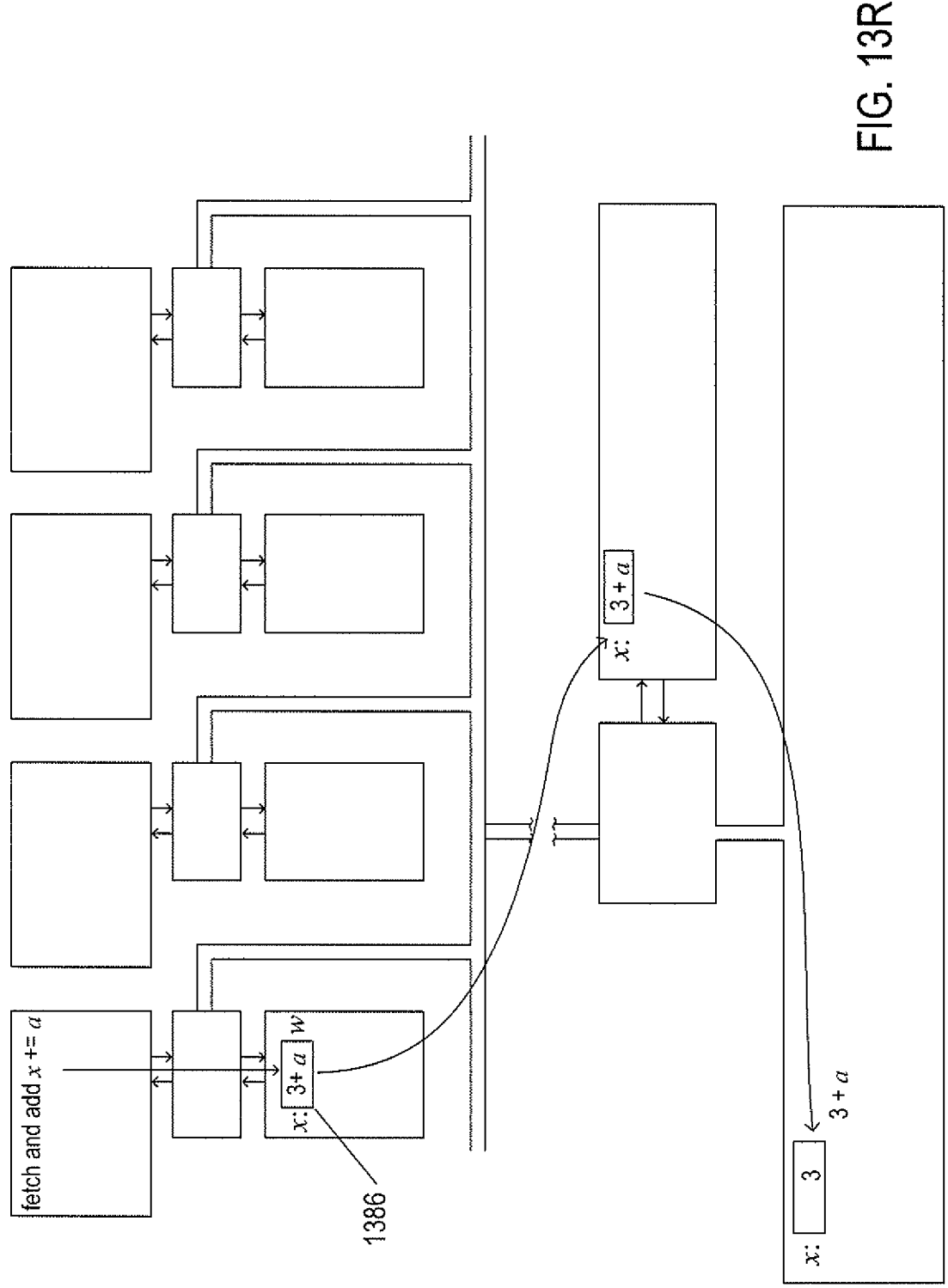

FIGS. 13Q-R illustrate an atomic fetch-and-add instruction. A fetch-and-add instruction retrieves the value of a memory location and writes an updated value to the memory location in one indivisible execution. This is similar to a test-and-set instruction or a compare-and-swap instruction, which are used to implement various synchronization objects and methods, including semaphores and mutexes. Not only is the fetch-and-add instruction atomic within a processing entity that executes it, execution of a fetch-and-add instruction also involves addressing potential contention within the hierarchical caches of a hierarchical-cache-based multi-processing-entity system. As shown in FIG. 13Q, using the same illustration conventions as used in FIGS. 13A-P, execution of a fetch-and-add instruction 1384 involves first communicating with a centralized directory or with other cache controllers to obtain an exclusive access to the memory location to which the fetch-and-add instruction is directed. In FIG. 13Q, local copy 1386 of memory location x is obtained, with exclusive access, as a result of the communications with other controllers or with a centralized directory and fetching the value of memory location x from a higher-level cache or main memory. Then, the local copy memory location x is updated to include the most recent value for memory location x. In the example shown in FIG. 13Q, this involves fetching the value from memory location x 1320 in main memory 1306. Next, as shown in FIG. 13R, while exclusive access is maintained on the local copy of memory value x, a new value, in this case the value 3+a, is written to the local copy 1386 of memory value x and, in those systems that feature write-through semantics, is directed to higher-level caches and main memory. Thus, a fetch-and-add instruction guarantees that the memory location to which it is directed will be exclusively accessed to return the value stored in that memory location, without interference by any other executing entity, and that a new value will be written to the memory location prior to relinquishing exclusive access.

Figure 14A:
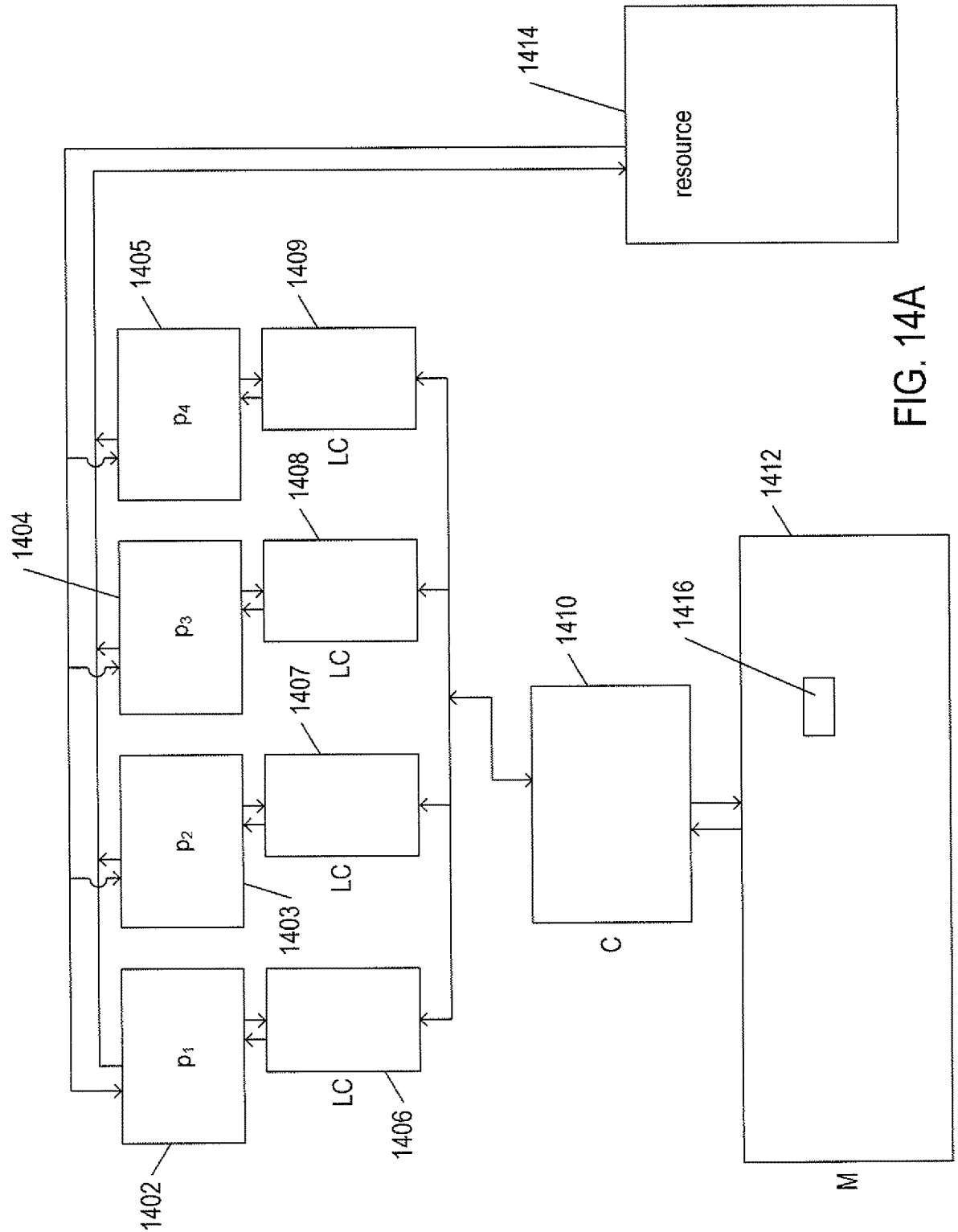

The Efficient, Non-blocking Flow Control Mechanism to Which the Current Document is Directed FIGS. 14A-B illustrate a common approach to flow control of a resource in a multi-processing-entity computer system. FIG. 14A uses illustration conventions similar to those used in FIGS. 13A-R. The multi-processing-entity computer system is abstracted as four processing entities 1402-1405, four associated local caches 1406-1409, a higher-level cache 1410, and main memory 1412.

In addition, FIG. 14A shows a computational resource 1414 that is accessed by the four processing entities. The computational resource may be any of many different internal components of a multi-processing-entity computer system, including various types of I/O controllers, including I/O device controllers, disk controllers, and communications-hardware controllers, and other types of shared resources. Computational resources typically provide an electronic interface through which a process or thread conduct one or more electronic transactions, such as receiving data from the computational resource, transmitting data to the computational resource, and issuing commands to the computational resource. It is common to use a synchronization-object-based flow-control method within multi-processing-entity computer systems in order to control and limit the rate of access to a resource, such as resource 1414. In FIG. 14A, this synchronization object 1416 is shown as a small portion of main memory. The synchronization object may include stored data associated with a lock or semaphore as well as stored data that maintains a count representing a number of concurrent accesses to the computational resource that can still be allowed. When the count falls below 1, further access to the shared computational resource is blocked until a current access terminates, and the count is incremented by the process or thread following termination of its access. By this method, the multi-processing-entity computer system ensures that only a maximum number of concurrent accesses are made to the resource. No attempt is made to fairly distribute shared-computational-resource accesses among processing entities.

FIG. 14B provides a C++-like pseudocode implementation of a conventional lock-based flow-control mechanism for a multi-processing-entity computer system. The class declaration resource_lock 1420 defines a resource-lock object that includes: (1) a data member count 1422, the number of accesses to a computational resource that can still be made; (2) a constructor for the class resource_lock 1424; (3) a public member function getResource 1426 which is called by a thread or process to receive permission to access the computational resource; and (4) a public member function returnResource 1428 which is called by a thread or process to indicate that access to the computational resource has terminated. The constructor for the class resource_lock 1430 initializes an instance of the class resource_lock by setting the data member count to the constant maxUsage 1432, the maximum allowed number of concurrent accesses to the computational resource. The member function getResource 1434 returns a Boolean value to indicate to a calling process or thread whether the process or thread can access the computational resource. A local variable current 1436 is used in a do-while loop 1438 to atomically access the data member count using a compare-and-swap instruction, a processor instruction represented in FIG. 14B by the function compare_and_swap. A compare-and-swap instruction takes 3 arguments: (1) a reference to a memory location; (2) a first value; and (3) a second value. The compare-and-swap instruction, in one uninterruptible or atomic process, determines whether or not the memory location referenced by the first argument contains a value equal to the value supplied as the second argument and, if so, replaces the value in the memory location referenced by the first argument with the value supplied as the third argument. In the current case, when the value of the data member count is the same as the value read from the data member count an placed in the local variable current, then no other process or thread has made an intervening access to data member count, and therefore the compare-and-swap instruction has successfully decremented the data member count and, by doing so, recorded an access to the computational resource. The do-while loop 1438 continues until the data member count is successfully accessed following setting of the local variable current to the value of data member count 1440, without an intervening change in the value of data member count, or until the value of data member count falls below 1, indicating that a number of other processes and/or threads are currently accessing the computational resource. The member function returnResource 1442 uses an atomic-increment processor instruction to atomically, or uninterruptibly, increment the value stored in the data member count, allowing another subsequent concurrent access to the computational resources.

Figure 14C:
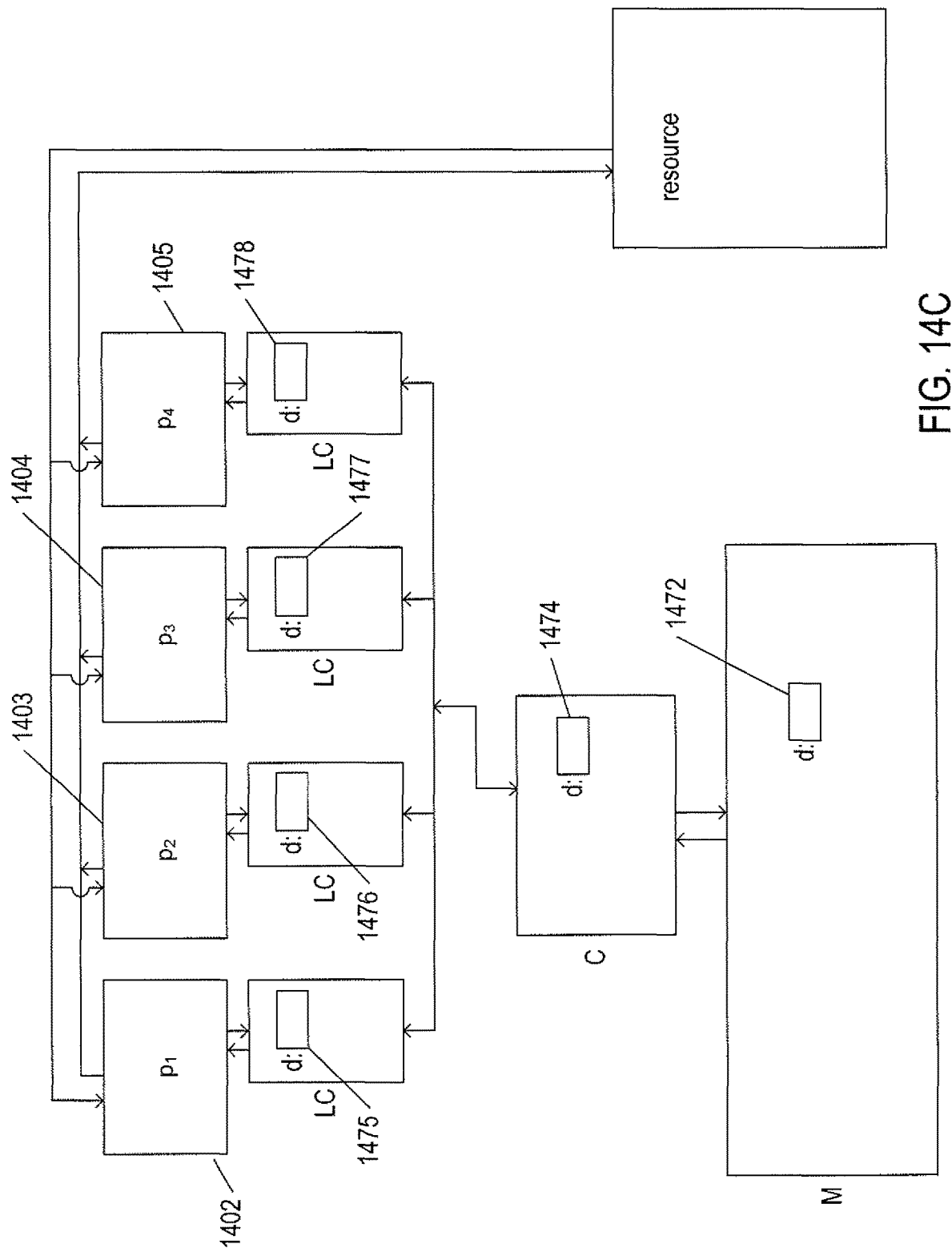
FIG. 14C illustrates a drawback to the flow-control mechanism described above with reference to FIGS. 14A-B.

FIG. 14C illustrates a drawback to the flow-control mechanism described above with reference to FIGS. 14A-B. Because the system employing the flow-control mechanism is a multi-processing-entity system with a hierarchical caching mechanism, the data member of an instance of the class resource_lock 1472, shown in FIG. 14C by a rectangle labeled with the character string "d:," ends up being frequently accessed by most or all of the processing entities 1402-1405 which share the resource 1414. As a result, copies 1474-1478 of the data member 1472 end up being stored in the various caches. Whenever the compare-and-swap instruction is executed, the cache controller of the processing entity that executes the instruction attempts to acquire exclusive access to the memory location corresponding to the data member count, involving passing of messages among the local cache controllers or exchange of messages with a centralized directory service, as discussed above with reference to FIGS. 13A-R. Acquisition of exclusive access to the memory location corresponding to the data member count may involve updating of local caches and significant communications overhead. Therefore, use of the flow-control mechanism may involve a significant overhead of cache-controller contention-control message exchange as well as significant single threading of threads and processes within the multi-processing-entity system. When the resource is heavily used, these overheads may become considerable, and deleteriously affect the computational bandwidth and instruction-execution throughput of the system as a whole.

Figure 15A:
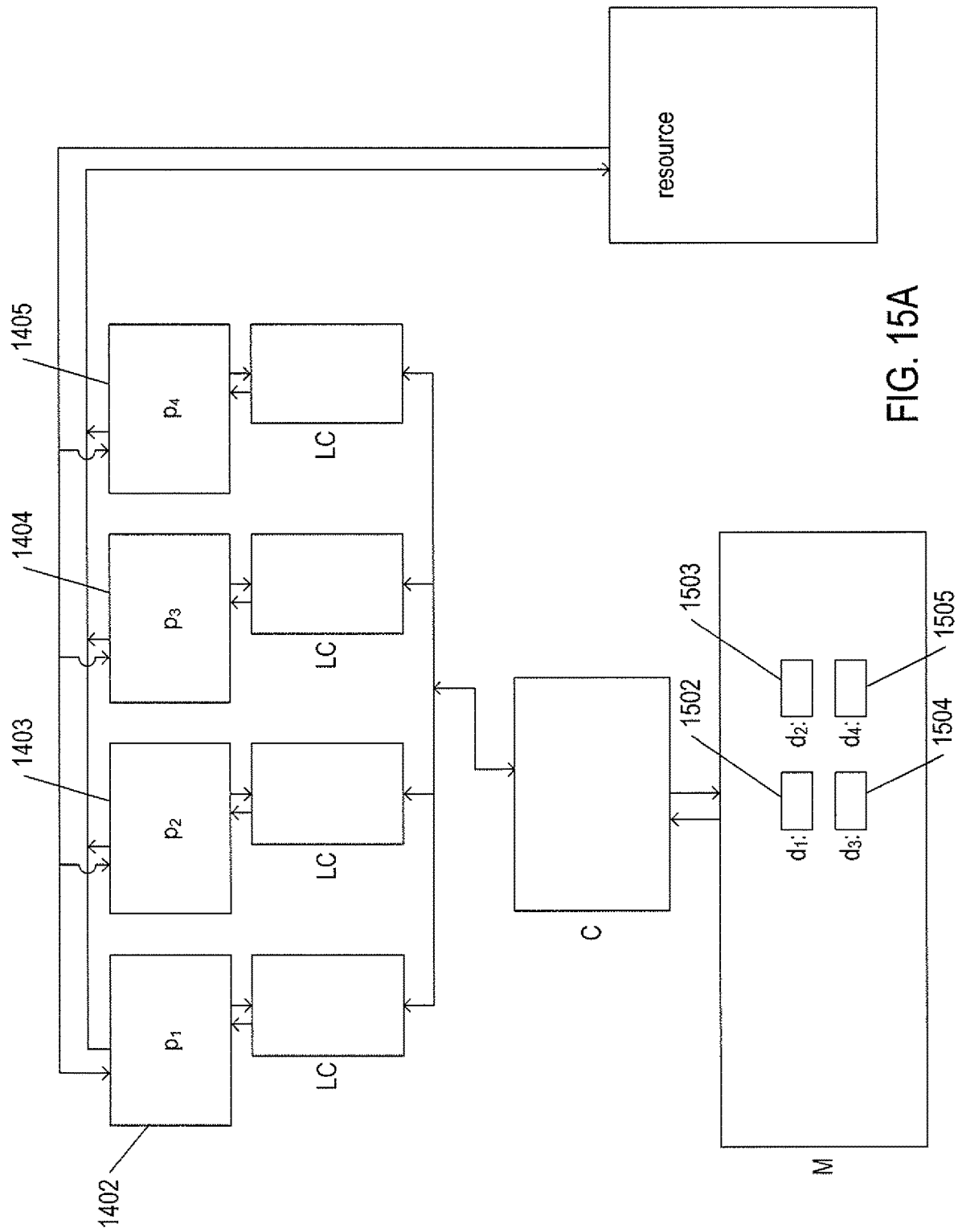
Figure 15B:
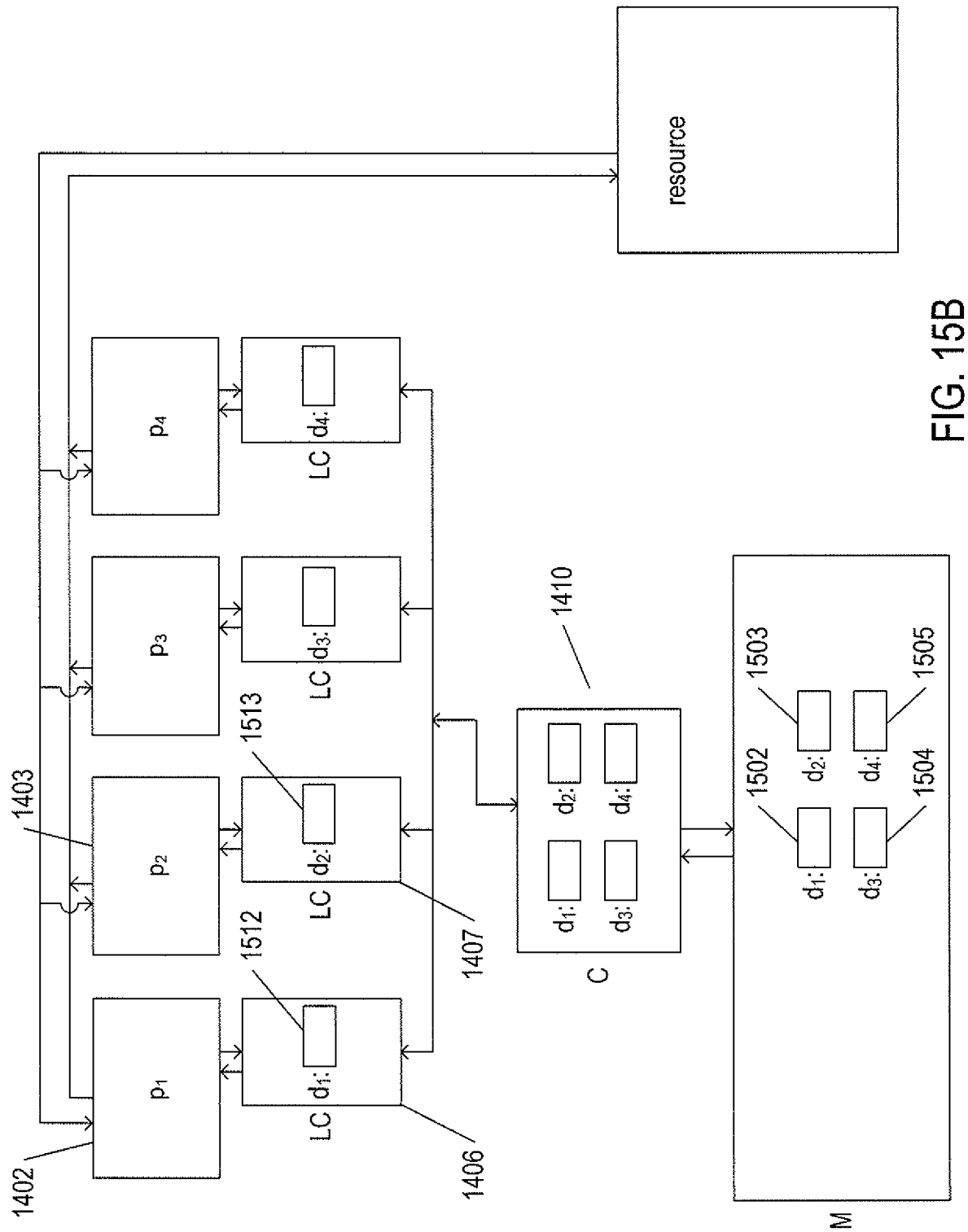

FIGS. 15A-M illustrate one implementation of an efficient, non-blocking flow-control mechanism that ameliorates the contention-control overheads suffered by the traditional flow-control mechanism discussed above with reference to FIGS. 14A-C. As shown in FIG. 15A, the efficient, non-blocking flow-control mechanism employs a number of flow-control data structures 1502-1505 equal to the number of processing entities 1402-1405. Note that FIGS. 15A-B use the same illustration conventions as used in FIGS. 14A and 14C. These processor-associated data structures 1502-1505 are each assigned to a single processing entity. As a result, as shown in FIG. 15B, during operation of the system, the four processor-associated data structures 1502-1505 migrate to the higher-level cache 1410, but only the processor-associated data structure assigned to a particular processing entity migrates to that processing entity's local cache. In other words, local cache 1406 contains a copy 1512 of processor-associated data structure 1502, which is associated with processing entity 1402, but does not contain copies of the other three processor-associated data structures 1503-1505. Similarly, local cache 1407 contains a copy 1513 of processor-associated data structure 1503, which is associated with processing entity 1403, but does not contain any of the other processor-associated data structures 1502 and 1504-1505. As a result, when a process or thread executing on a particular processing entity accesses the processor-associated data structure associated with the processing entity, there is no need for complicated messages exchanges between cache controllers and/or a directory, since there is no contention for the processor-associated data structure among cache controllers. Each of data structures 1502-1505 is assigned to memory so that no more than one of the data structures occupies any particular cache line. In other words, when one of the data structures 1502-1505 is accessed by a thread or processor, the access does not inadvertently result in portions of two or more of the data structures occupying a cache line ending up in the local cache of the processor executing the thread or process. Furthermore, as discussed below, a process or thread generally does not need to wait on a synchronization object in order to access a local access pool, and thus a greater amount of parallel execution is permitted by the flow-control mechanism. In the case that a processor or thread is not able to gain access to the computational resource, contention control and exclusive locking by cache controllers may result from an attempt to redistribute accesses among processing entities, as discussed further, below, but this is generally an infrequent occurrence. Therefore, the significant computational overheads suffered by the typical flow-control mechanism discussed above with reference to FIGS. 14A-C, including overheads associated with cache-controller contention-control message passing as well single threading of processes and threads with respect to access to the synchronization object are generally avoided, significantly increasing the effective computational bandwidth and execution throughput of the multi-processing-entity computer system.

Figure 15C:
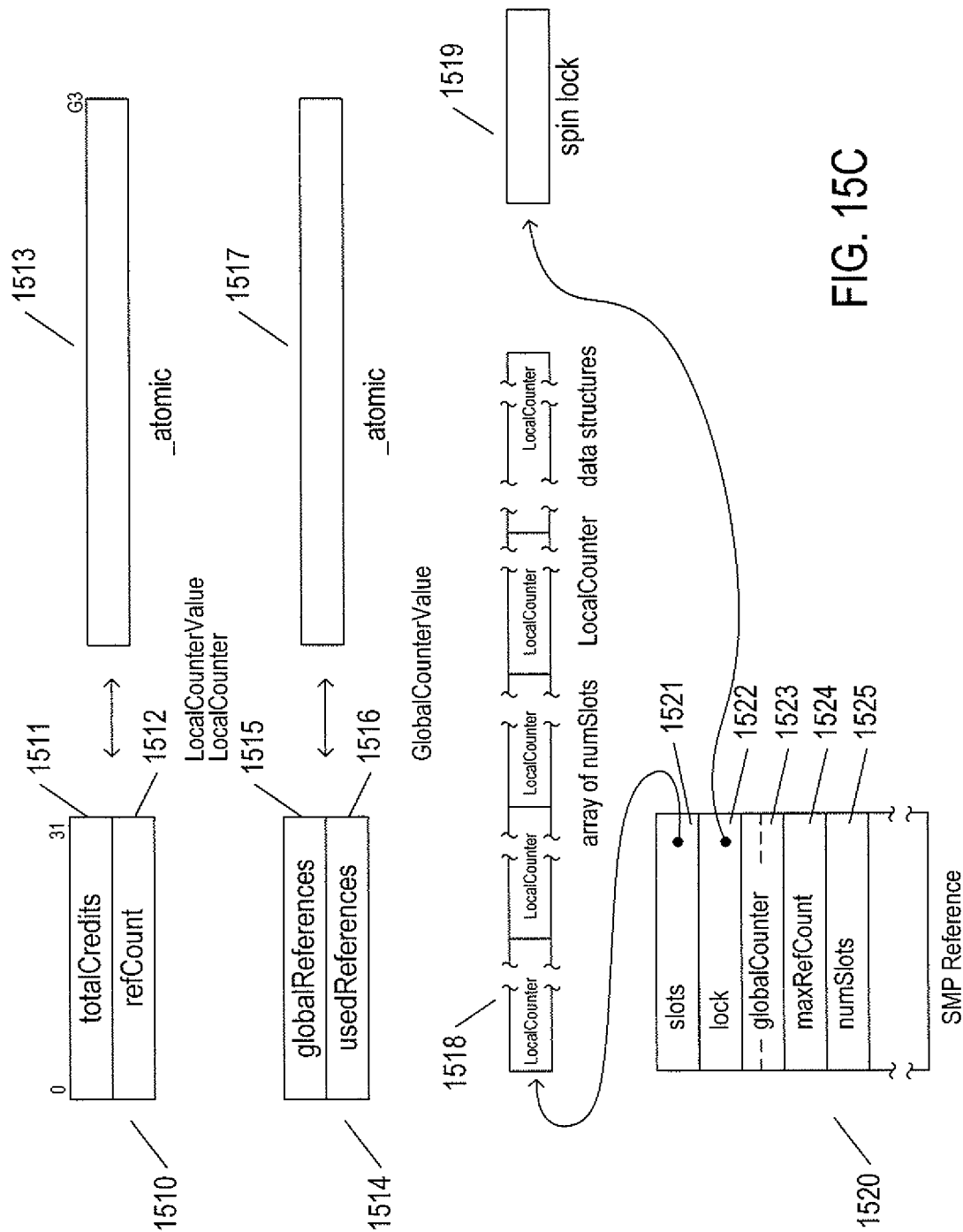

FIG. 15C illustrates data structures used in a subsequently discussed implementation of an efficient, non-blocking flow-control mechanism. A first LocalCounterValue 64-bit data structure 1510 includes a first 32-bit field totalCredits 1511, which contains the total number concurrent accesses to a computational resources available to threads and processes of a processor, core, or other processing entity, and a second 32-bit field refCounter 1512, the number of concurrent accesses currently being made to the computational resource. The LocalCounterValue data structure 1510 can be alternatively viewed as a 64-bit object containing the single 64-bit field_atomic 1513. A LocalCounterValue data structure aligned within a number of bits corresponding to a cache line is referred to as a "LocalCounter data structure."

A second data structure GlobalCounterValue 1514 includes a first 32-bit field globalReferences 1515, which contains the number concurrent accesses to the computational resources independent of the accesses allowed to individual processing entities, and a second 32-bit field usedReferences 1516, the number of concurrent accesses currently being made to the computational resource. The GlobalCounterValue 1514 can also be alternatively viewed as a 64-bit object containing the single 64-bit field _atomic 1517.

Additional data structures include an array of LocalCounter data structures 1518, a spin lock 1519, and a data structure SMPReference 1520 that represents the efficient, non-blocking flow-control data employed by the currently described efficient, non-blocking flow-control mechanism for a particular computational resource. The data structure SMPReference 1520 includes the following fields: (1) slots 1521, a pointer to the array of LocalCounter data structures 1518; (2) lock 1519, a pointer to the spin lock 1519; (3) globalCounter 1523, an instance of the data structure GlobalCounterValue; (4) maxRefCount 1524, the maximum number of concurrent accesses allowed to the computational resource; (5) numSlots 1525, the number of LocalCounter data structures in the array 1518, generally equal to the number of processing entities; and additional fields used to monitor statistics for the efficient, non-blocking flow-control mechanism.

Figure 15D:
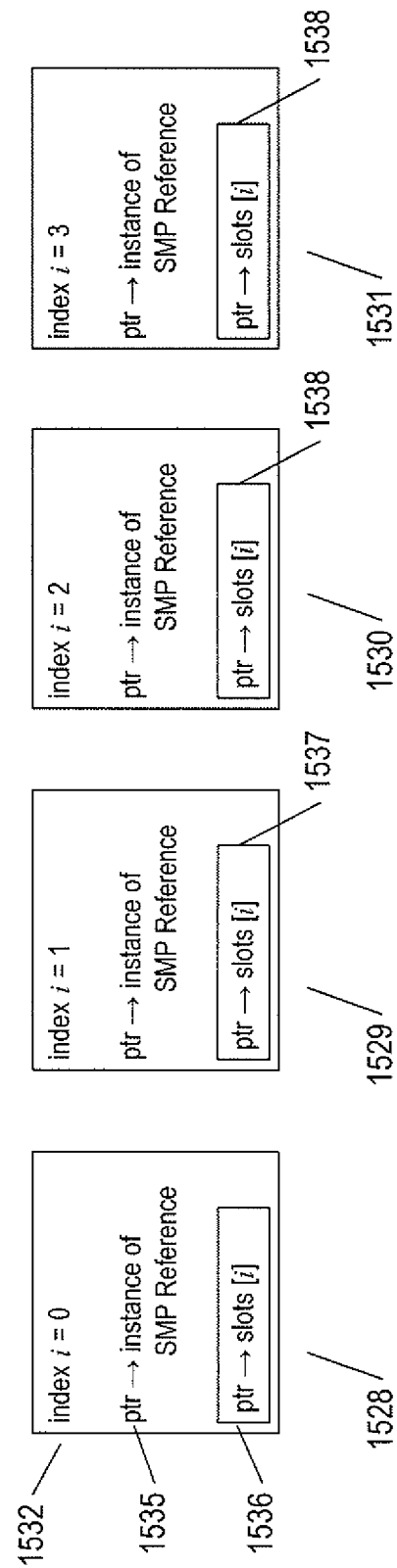

FIG. 15D illustrates the local-cache contents related to the efficient, non-blocking flow-control mechanism for a particular computational resource for the local caches associated with the processing entities in a multi-processing-entity computer system. The contents of four local caches 1528-1531 are shown in FIG. 15D. Each local cache, such as local cache 1528, includes: (1) a local index i 1532 uniquely assigned to the local cache; (2) a pointer ptr 1535 to an instance of the data structure SMPReference; and (3) a local copy 1536 of a LocalCounter data structure indexed by index i within the array of LocalCounter data structures referenced by data member slots of the instance of the data structure SMPReference referenced by the third pointer. The items 1532, 1535, and 1536 may not all be resident at any particular point in time in a given local cache, but they are the basic data items needed to access the computational resources through the efficient, non-blocking flow-control mechanism. Most importantly, only the local copy of the LocalCounter data structure indexed by index i is written to, in the normal case, during an attempt by a process or thread to access the computational resource, and since each local processor has its own, unique index, the local copies of the LocalCounter data structure 1536-1539 are only accessed by their respective processing entities. Thus, there is no need for expensive contention control for access to these local copies by the corresponding local cache controllers, as discussed above with reference to FIGS. 15A-S.

FIGS. 15E-M provide an implementation of the efficient, non-blocking flow-control mechanism discussed above with reference to FIGS. 15A-B. A great deal of this implementation is devoted to the processes for handling cases in which a thread or process running on a first processing entity cannot directly obtain permission to access a computational resource, but, instead, non-local operations need to be carried out to attempt to obtain access permission by changing the number of accesses allocated to one or more other processing entities. Only the portion of the implementation related to the normal, local operations for obtaining permission to access the computational resource and terminating an access are discussed below. The remaining portions of the implementation included in FIGS. 15E-K are provided for the sake of completeness.

Declarations 1540, 1542, and 1544 in FIG. 15E define the LocalCounterValue, GlobalCounterValue, and SMPReference data structures discussed above with reference to FIGS. 15C-D. An implementation of the routine SMPfAdd, used by threads and processes in a fashion similar to the routine getResource, discussed above with reference to FIG. 14C, is provided by code portion 1546 in FIG. 15F. An implementation of the routine SMPfRemove, used by threads and processes in a fashion similar to the routine returnResource, discussed above with reference to FIG. 14C, is provided by code portions 1550 in FIG. 15G.

The routine SMPfAdd returns a Boolean value and receives three arguments 1554: (1) ref, a pointer to the SMPReference data structure for the computational resource to be accessed; (2) slot, the index of the LocalCounter assigned to the processing entity that executes the caller of the routine SMPfAdd; and (3) lockHeld, a Boolean value that is FALSE for the general case in which a thread or process calls the routine SMPfAdd in order to receive permission to access the computational resource. On line 1556, the routine SMPfAdd sets a local variable lCounter to reference the LocalCounter assigned to the processing entity that executes the caller of the routine SMPfAdd. On line 1558, the routine SMPfAdd atomically increments the refCount field of the LocalCounter reference by lCounter. When the increment operation results in refCount having a value less than 0 or greater than or equal to the value of the field totalCredits, as determined by statement 1560, then, in code block 1562, the routine SMPfAdd attempts to obtain accesses from other processing entities, by a call to the routine SMPRefExpandLocalReferenceLimit. When that fails, the atomic increment is atomically reversed 1564 and the return value for the routine SMPfAdd is set to FALSE. Otherwise, either when the atomic increment did not produce an invalid value for refCount or when the call to the routine SMPRefExpandLocalReferenceLimit succeeded, the return value for the routine SMPfAdd remains TRUE, as initialized on line 1566.

The routine SMPfRemove returns no value and receives three arguments 1568: (1) ref, a pointer to the SMPReference data structure for the computational resource to be accessed; (2) slot, the index of the LocalCounter assigned to the processing entity that executes the caller of the routine SMPfAdd; and (3) lockHeld, a Boolean value that is FALSE for the general case in which a thread or process calls the routine SMPfRemove in order to indicate that access to the computational resource is terminated. On line 1570, the routine SMPfRemove sets a local variable lCounter to reference the LocalCounter assigned to the processing entity that executes the caller of the routine SMPfRemove. On line 1572, the routine SMPfRemove atomically decrements the refCount field of the LocalCounter reference by lCounter. Code block 1574 is only called for rare instances in which atomic decrement of the refCount field produces a refCount value less than 1.

Thus, as discussed above with reference to FIGS. 15A-B, the currently disclosed efficient, non-blocking flow-control mechanism does not employ locking and does not incur expensive cache-level contention control for data shared among local caches for the normal case in which there are sufficient access permissions available for the processing entity executing a process or thread seeking to access a computational resource managed by the efficient, non-blocking flow-control mechanism. Again, the remaining portions of the implementation shown in FIGS. 15E-K are related to the rare cases in which non-local operations are employed to redistribute access permissions among multiple computational entities.

In general, the efficient, non-blocking flow-control mechanism to which the current document is directed relies principally on distributing an access pool by assigning local access pools to each of multiple processing entities within a multi-processing-entity computation environment and their associated local caches. By doing this, significant computational overheads involved in contention control among cache controllers for the data structures that represent a single access-pool are avoided. In addition, threads and processes executing on a particular processing entity generally access the local flow-control mechanism via simple atomic increment and decrement instructions, rather than using more complex instructions that involve locking the flow-control mechanism for access while other processes and threads wait for an opportunity to access the flow-control mechanism. Avoiding contention control for a single shared access pool provides additional computational bandwidth to a multi-processing-entity computer system that flow-controls access to a computational resource is shared among processes and threads executing on multiple processing entities.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to obtain alternative implementations, including selection of hardware layers, operating systems, virtualization layers, programming languages, modular organization, data structures, control structures, and other such design and implementation parameters. Contention control for distributed access pools, the number and types of data members and function members used to implement the flow-control mechanism, and other details may vary with different implementations. However, in general, computational bandwidth is increased by avoiding contention control for a single shared access pool by cache controllers and by avoiding locking-based mechanisms for accessing the access pool by processes and threads. As one example, the described implementation employs a 64-bit atomic increment instruction to update the 32-bit refCount field in a 64-bit LocalCounterValue data structure, but an alternative implementation may use a 16-bit refCount field in a 32-bit LocalCounterValue data structure. Other field sizes and atomic-operation operand sizes are possible. Different types of atomic operations may be alternatively employed in alternative implementations. Of course, the type and numbers of fields in the various data structures may also vary with different implementations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A flow-control component of a multi-processing-entity computer system, the flow-control component comprising:
   a shared computational resource;
   two or more local access pools, together comprising a distributed access pool, each local access pool uniquely associated with a processing entity; and
   a process or thread that accesses the shared computational resource when a local access pool associated with the processing entity on which the process or thread executes contains at least one shared-computational-resource access and when the process or thread first removes a shared-computational-resource access from the local access pool before accessing the shared computational resource.

2. The flow-control component of claim 1 wherein the shared computational resource is a computer-system component with an electronic interface through which a process or thread may conduct an electronic transaction selected from among:

receiving data for the computational resource;

transmitting data to the computational resource; and issuing commands to the computational resource.

3. The flow-control component of claim 2 wherein computational resources include:

I/O devices;

networking devices;

data-storage devices; and processor-controlled devices.

4. The flow-control component of claim 1 wherein each local access pool maintains a count, having a value stored in a main memory, that represents the number of shared-computational-resource accesses contained in the access pool.

5. The flow-control component of claim 4 wherein only the local cache of the processing entity associated with the local access pool contains a copy of the count maintained by the local access pool.

6. The flow-control component of claim 4 wherein a process or thread removes a shared-computational-resource access from a local access pool, a copy of the count of which is stored in the local cache of a processing entity on which the process or thread is executing, by carrying out an atomic operation that returns a value stored in the count maintained by the local access pool at the start of the atomic operation and that changes the value stored in the count maintained by the local access pool.

7. The flow-control component of claim 6 wherein the atomic operation changes the value of the count by one of:

decrementing the value stored in the count;

incrementing the value stored in the count;

adding a value other than one to the value stored in the count; and subtracting a value other than one from the value stored in the count.

8. The flow-control component of claim 6 wherein the atomic operation is an atomic increment instruction.

9. The flow-control component of claim 4 wherein, when the count falls below 1, the flow-control component attempts to transfer shared-computational-resource accesses from one or more processing entities other than the processing entity on which the process or thread executes.

10. A method that controls a rate of access to a shared computational resource in a multi-processing-entity computer system, the method comprising:

initializing a distributed access pool comprising two or more local access pools, each uniquely associated with a processing entity, to contain a number of shared-computational-resource accesses distributed among the local access pools; and removing, by a process or thread, a shared-computational-resource access from a local access pool associated with a processing entity on which the process or thread executes prior to accessing the shared-computational-resource.

11. The method of claim 10 wherein the shared computational resource is a computer-system component with an electronic interface through which a process or thread may conduct an electronic transaction selected from among:

receiving data for the computational resource;

transmitting data to the computational resource; and issuing commands to the computational resource.

12. The method of claim 11 wherein computational resources include:

I/O devices;

networking devices;

data-storage devices; and processor-controlled devices.

13. The method of claim 11 wherein each local access pool maintains a count, having a value stored in a main memory that represents the number of shared-computational-resource accesses contained in the access pool.

14. The method of claim 13 wherein only the local cache of the processing entity associated with the local access pool contains a copy of the count maintained by the local access pool.

15. The method of claim 13 wherein a process or thread removes a shared-computational-resource access from a local access pool, a copy of the count of which is stored in the local cache of a processing entity on which the process or thread is executing, by carrying out an atomic operation that returns a value stored in the count maintained by the local access pool at the start of the atomic operation and that changes the value stored in the count maintained by the local access pool.

16. The method of claim 15 wherein the atomic operation changes the value of the count by one of:

decrementing the value stored in the count;

incrementing the value stored in the count;

adding a value other than one to the value stored in the count; and subtracting a value other than one from the value stored in the count.

17. The method of claim 15 wherein the atomic operation is an atomic increment instruction.

18. The method of claim 13 wherein, when the count falls below 1, the flow-control component attempts to transfer shared-computational-resource accesses from one or more processing entities other than the processing entity on which the process or thread executes.

19. A data-storage device of a multi-processing-entity computer system storing computer instructions, that, when executed by the processing entities, control the multi-processing-entity computer system to control a rate of access to a shared computational resource by:

initializing a distributed access pool comprising two or more local access pools, each uniquely associated with a processing entity, to contain a number of shared-computational-resource accesses distributed among the local access pools; and removing, by a process or thread, a shared-computational-resource access from a local access pool associated with a processing entity on which the process or thread executes prior to accessing the shared-computational-resource.

20. The data-storage device of claim 19 wherein the shared computational resource is a computer-system component with an electronic interface through which a process or thread may conduct an electronic transaction selected from among receiving data for the computational resource, transmitting data to the computational resource, and issuing commands to the computational resource; and wherein computational resources include I/O devices, networking devices, data-storage devices, and processor-controlled devices.

* * * * *